(12) United States Patent
Johnson et al.

(10) Patent No.: US 11,034,883 B2
(45) Date of Patent: *Jun. 15, 2021

(54) LOW MOLECULAR WEIGHT POLYACRYLATES FOR EOR

(71) Applicants: ConocoPhillips Company, Houston, TX (US); University of Kansas, Lawrence, KS (US)

(72) Inventors: Stephen J Johnson, Lawrence, KS (US); Cory Berkland, Lawrence, KS (US); Ahmad Moradi-Araghi, Tulsa, OK (US); Jenn-Tai Liang, College Station, TX (US); Terry M. Christian, Bartlesville, OK (US); Riley B. Needham, Bartlesville, OK (US); Min Cheng, Bartlesville, OK (US); Ying-Ying Lin, Lawrence, KS (US); Andrew B. Woodside, Bartlesville, OK (US)

(73) Assignees: THE UNIVERSITY OF KANSAS, Lawrence, KS (US); CONOCOPHILLIPS COMPANY, Houston, TX (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/989,350

(22) Filed: Jan. 6, 2016

(65) Prior Publication Data
US 2016/0115371 A1 Apr. 28, 2016

Related U.S. Application Data

(63) Continuation-in-part of application No. 14/060,749, filed on Oct. 23, 2013, now Pat. No. 10,093,848.

(Continued)

(51) Int. Cl.
  C09K 8/588 (2006.01)
  E21B 43/16 (2006.01)
  (Continued)

(52) U.S. Cl.
  CPC .............. *C09K 8/588* (2013.01); *C09K 8/035* (2013.01); *C09K 8/584* (2013.01); *C09K 8/604* (2013.01);
  (Continued)

(58) Field of Classification Search
  CPC ............ C09K 2208/10; C09K 2208/22; C09K 2208/32; C09K 8/035; C09K 8/524;
  (Continued)

(56) References Cited

U.S. PATENT DOCUMENTS 6,387,986 B1* 5/2002 Moradi-Araghi ...... C09K 8/516
  166/300
7,644,764 B2 1/2010 Berkland et al.
(Continued)

OTHER PUBLICATIONS

International Search Report for analogous case, App. No. PCT/US16/12338, dated Mar. 28, 2016.
(Continued)

*Primary Examiner* — Alicia Bland
(74) *Attorney, Agent, or Firm* — Boulware & Valoir

(57) ABSTRACT

The disclosure is directed to low molecular weight polyelectrolyte complex nanoparticles that can be used to deliver agents deep into hydrocarbon reservoirs. Methods of making and using said polyelectrolyte complex nanoparticles are also provided.

4 Claims, 16 Drawing Sheets

Related U.S. Application Data

(60) Provisional application No. 62/112,514, filed on Feb. 5, 2015, provisional application No. 62/100,334, filed on Jan. 6, 2015, provisional application No. 61/757,276, filed on Jan. 28, 2013.

(51) Int. Cl.
| | |
|---|---|
| *C09K 8/035* | (2006.01) |
| *C09K 8/60* | (2006.01) |
| *C09K 8/584* | (2006.01) |
| C09K 8/528 | (2006.01) |
| C09K 8/524 | (2006.01) |

(52) U.S. Cl.
CPC ............. *E21B 43/16* (2013.01); *C09K 8/524* (2013.01); *C09K 8/528* (2013.01); *C09K 2208/10* (2013.01); *C09K 2208/22* (2013.01); *C09K 2208/32* (2013.01)

(58) Field of Classification Search
CPC ........ C09K 8/528; C09K 8/584; C09K 8/588; C09K 8/604
See application file for complete search history.

(56) References Cited

U.S. PATENT DOCUMENTS

| | | | |
|---|---|---|---|
| 2008/0058229 A1* | 3/2008 | Berkland | ............... C09K 8/516 507/211 |
| 2010/0056399 A1 | 3/2010 | Berkland | |
| 2011/0160102 A1* | 6/2011 | Jackson | ................ C09K 8/588 507/230 |
| 2014/0209305 A1 | 7/2014 | Lin | |

OTHER PUBLICATIONS

Cordova, M.; Cheng, M.; Trejo, J.; Johnson, S. J.; Willhite, G. P.; Liang, J.-T.; Berkland, C., Delayed HPAM gelation via transient sequestration of chromium in polyelectrolyte complex nanoparticles. Macromolecules 2008, 41 (12), 4398-4404.

Johnson, S. J.; Trejo, J.; Veisi, M.; Willhite, G. P.; Liang, J.-T.; Berkland, C., Effects of divalent cations, seawater and formation brine on positively charged polyethylenimineldextran sulfate/Cr(III) polyelectrolyte complexes and HPAM/Cr(III) gelation. Journal of Applied Polymer Science 2010, 115 (2), 1008-1014.

\* cited by examiner

US 11,034,883 B2

LOW MOLECULAR WEIGHT POLYACRYLATES FOR EOR

CROSS-REFERENCE TO RELATED APPLICATIONS

This invention claims priority to U.S. Provisional Application No. 62/100,334, filed on Jan. 6, 2015 and U.S. Provisional Application No. 62/112,514, filed on Feb. 6, 2015. This invention is also a continuation-in-part of U.S. Non-Provisional application Ser. No. 14/060,749, filed Oct. 23, 2013, and U.S. Provisional Application No. 61/757,276, filed on Jan. 28, 2013. Each of these applications is incorporated by reference in its entirety herein for all purposes.

FEDERALLY SPONSORED RESEARCH STATEMENT

Not applicable.

REFERENCE TO MICROFICHE APPENDIX

Not applicable.

FIELD OF THE DISCLOSURE

This disclosure relates to compositions and processes for oil field applications. More specifically, this disclosure relates to polyelectrolyte complex (PEC) nanoparticle systems for controlled release of a cross-linking agent, such as chromium or PEI, that can be used to mediate a delayed gelling or crosslinking reaction. Such polymers can be applied to improve the performance of secondary and tertiary enhanced oil recovery processes, but can also be used whenever a delayed reaction is needed.

BACKGROUND OF THE DISCLOSURE

The challenge for all oil and gas companies is to produce as much oil as commercially feasible, leaving as little oil as possible trapped and wasted inside the reservoir. During the primary recovery stage, reservoir drive comes from a number of natural mechanisms. These include natural water pushing oil towards the well, expansion of the natural gas at the top of the reservoir, expansion of gas initially dissolved in the crude oil, and gravity drainage resulting from the movement of oil within the reservoir from the upper regions to lower regions where the wells are located. Recovery factor during the primary recovery stage is typically about 5-15% under such natural drive mechanisms.

Over the lifetime of the well, however, the pressure will eventually fall, and at some point there will be insufficient underground pressure to force the oil to the surface. Once natural reservoir drive diminishes, secondary and tertiary recovery methods are applied to further increase recovery.

Secondary recovery methods rely on the supply of external energy into the reservoir in the form of injecting fluids to increase reservoir pressure, hence replacing or increasing the natural reservoir drive with an artificial drive. In addition, pumps, such as beam pumps, gas lift assisted pumping and electrical submersible pumps (ESPs), can be used to bring the oil to the surface. Secondary recovery techniques include increasing reservoir pressure by water injection, $CO_2$ injection, natural gas reinjection, and miscible injection (MI), the most common of which is probably water injection. Typical recovery factor from water-flood operations is about 30%, depending on the properties of oil and the characteristics of the reservoir rock. On average, the recovery factor after primary and secondary oil recovery operations is between 35 and 45%.

While secondary recovery techniques are quite effective, the existence of fractures and highly porous or permeable regions reduces their effectiveness. Any gas or liquid that is injected into a well, will naturally travel the least restrictive route, thus bypassing most of the oil in the less porous or permeable regions. Thus, the overall effectiveness of the sweep is reduced by these so-called "thief zones," which channel injection fluid directly to production wells.

In such cases, polymers, foams, gelants, emulsions and the like are injected into the thief zones in order to block these zones, thus diverting the subsequent injection fluids to push previously unswept oil towards the production wells. See e.g., FIGS. 1A-B.

Among the polymers used for such purposes, partially hydrolyzed polyacrylamide (HPAM) crosslinked with Cr(III) crosslinkers have been widely used for water shutoff and sweep improvement in field applications. Polymer gels have been applied in enhanced oil recovery to improve the sweep efficiency, prolong the life of an oil well and maximize the recoverable oil amount by placing the gelants deep into the reservoir and blocking the high-permeability channels.

One of the difficulties with the use of polymers to block thief zones is the issue of viscosity. Viscous polymers are difficult to pump and, in the presence of common crosslinking agents such as chromic acetate, gel too quickly, preventing placement deep in target zones. For this reason, there is considerable effort directed to delaying the crosslinking of polymers until they have already penetrated deep into the oil bearing reservoir.

The idea of using a polyelectrolyte complex for delaying the release of chromium was reported in previous applications US2008058229 (now U.S. Pat. No. 8,183,184) and US20100056399 (now U.S. Pat. No. 8,372,786). Those disclosures were directed to novel compositions for delivering, controlling, and delaying the release of an oil and gas field chemical to a target area. The composition comprised a polyanion and a polycation forming a polyelectrolyte complex, and an oil and gas field chemical associated with the polyelectrolyte complex. The oil and gas field chemical was preferably selected from the group consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and (h) a surfactant.

In this prior work, one such polyelectrolyte complex was exemplified with a crosslinking agent. The polyelectrolyte complex (PEC) nanoparticle was prepared with polyethylenimine (PEI, Mw 25 kDa) and dextran sulfate (DS). The PEC entrapped and controlled the release of Cr(III). Although the gelation time using PEC nanoparticles was greatly extended compared to chromium (III) acetate used alone (280 times slower than that of the control), the gelation time was still too short for reservoir temperatures higher than 40° C.

In another patent, U.S. Pat. No. 7,644,764 (US2008223578), we also reported on the delayed gelling made possible with a PEC that lacked multivalent cations. In that application, a solution comprising PEI and dextran sulfate or chitosan and dextran sulfate was preformed. When mixed with varying amounts of the ALCOFLOOD® 935, gelation delay of up to 12 days was observed, but the maximum temperature tested was only 40° C.

Further improvements can be made to the PEC nanoparticle system that can provide much longer gelation times at higher temperatures, preferably with less toxicity than the prior art PEC nanoparticle system. In the ideal case, the gelant should have low initial viscosity, extended low viscosity period, long gelation time, and abrupt viscosity increase at the end when gelant becomes gel. Furthermore, the gelant should have both positive and negative charges, allowing its uses to be tailored to various conditions and applications.

SUMMARY OF THE DISCLOSURE

The disclosure provides a large variety of compositions for use in delaying crosslinking of gels, as well as downhole and other industrial uses therefore, and is an improvement upon US20140209305.

In US20140209305, we described a polyelectrolyte complex (PEC) nanoparticle comprising a low molecular weight polyalkyleneimine, such PEI, and a polyanion, such as a sodium poly acrylate (PAA) or sodium polyvinyl sulfonate (PVS), and having a size of less than one micron. Together, the polyalkyleneimine and polyanion hold the multivalent cations within the PEC and allow for a gradual release thereof. However, smaller nanoparticles and longer delays are desired for more efficient and cost effective hydrocarbon recovery Further, better crosslinking of the tertiary polymer using PEC components are desired. Thus, the presently disclosed compositions improve upon the systems in US20140208305 by using more cost effective polyanions.

US20140209305 focused on preparing PECs with polyalkyleneimine that were less than 2 Da to reduce the toxicity. FIG. 22 (FIG. 2 in US20140209305) displays results from a cytotoxicity test of 800D PEI v. 25 KD PEI. The cytotoxicity of PEI was determined using the CellTiter 96® AQueous Cell Proliferation Assay System (MTS assay) from Promega. A549 cells were loaded into 96-wellplates with approximately 8,000 cells per well and incubated in a humid 5% $CO_2$ incubator at 37° C. After 18-24 h incubation, the medium was removed and the cells were washed with 100 µl of serum free-medium. Cells were then treated with the PEI solutions for 16 h. The serum-free media was removed and replaced with 100 µl of fresh media with 20 µl of the MTS reagent solution. The cells were incubated for 2 h at 37° C. in a 5% $CO_2$ incubator. Cell viability was assessed by measuring the absorbance at 490 nm using a plate reader (SpectraMax M5) and expressed as the percentage of viable cells treated PEI normalized to viable control cells in the absence of PEI.

According to the results shown in FIG. 22, the IC50 of PEI 25D was 30 µl/ml in the A549 cell lines, while the IC50 of PEI 800 D was never reached, even at concentrations more than 69 times higher (>2750 µg/ml). The concentrations of PEI 800D used in US20140209305 were much lower (48-84 µg/ml) and thus are much lower than the IC50, indicating their lack of toxicity.

However, higher molecular weight PEI at concentrations below the IC50 can still be utilized in PECs while maintaining lower toxicity. Further, Applicant believed that cheaper components in the PEC can be used and the secondary crosslinking by the polyalkyleneimine could be improved. Thus, polyalkyleneimine with different molecular weight were combined with smaller and cheaper polyanions to form more cost effective PECs with longer delays in gelling and improved secondary gelling through the use of the polyalkyleneimine as a crosslinker in addition to the metal ion. Because millions or tens of millions of pounds of polymer may be injected into a reservoir over a 1-2 year period of time, even a modest difference in the cost per pound of polymer will be quite significant.

In one embodiment, this disclosure provides a composition comprising a polyelectrolyte complex (PEC) nanoparticle comprising a low molecular weight polyalkyleneimine and a low molecular weight polyanion, and having a size of less than one micron. Such microparticles can be intimately associated with a multivalent cation crosslinker, or not, depending on what application the PEC nanoparticle will be used for. In preferred embodiments, the polyalkyleneimine is of a small molecular weight, e.g., less than 26,000 Da. The polyanion has a low molecular weight of less than 40,000 Da and is a cheaper alternative to prior art polyanions. In preferred embodiments, the polyanion is a sodium polyacrylate or sodium polyvinyl sulfonate with a molecular weight of less than 10,000 Da.

Though lower molecular weight polymers are used for the nanoparticles, gelation times were extended by a few days.

Other embodiments provide a composition for controlling the release of an oil and gas field chemical comprising a polyelectrolyte complex, as herein described, said polyelectrolyte complex associated with an oil and gas chemical selected from the group consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and (h) a surfactant.

Other compositions comprise a polyelectrolyte complex nanoparticle comprising a polyethylenimine (PEI) of less than 26,000 Da and sodium polyacrylate or sodium polyvinyl sulfonate of less than 10,000 Da, either alone or intimately associated with a chromium or other multivalent cationic crosslinker, said nanoparticle having a size of less than one micron, wherein said nanoparticle has a predominance of positive charges and the amount of sodium polyacrylate exceeds the amount of PEI. Alternatively, the complex can have net negative charge, and the ratios reversed.

Yet other embodiments provide a delayed gelling composition comprising any of the PEC nanoparticles herein described, plus a polymer that can be crosslinked with said low molecular weight PEI and/or said multivalent cation crosslinker; and an injection fluid, typically brine, river water, seawater, produced water and the like.

In another embodiment, the disclosure provides a composition comprising a polyelectrolyte complex nanoparticle comprising a PEI of less than 26,000 Da and sodium polyacrylate of less than 10,000 Da intimately associated with a chromium ion crosslinker, said nanoparticle having a size of less than one micron.

In some embodiments, the disclosure provides a composition comprising a polyelectrolyte complex nanoparticle comprising a PEI of less than 26,000 Da and a sodium polyvinyl sulfonate of less than 40,000 Da intimately associated with a chromium ion crosslinker, said nanoparticle having a size of less than one micron.

In another embodiment, the disclosure provides a composition comprising a polyelectrolyte complex nanoparticle comprising a PEI of less than 26,000 Da and sodium polyvinyl sulfonate of less than 10,000 Da intimately associated with a chromium ion crosslinker, said nanoparticle having a size of less than one micron.

The polyanion can be selected from sodium polyacrylate, sodium polyvinyl sulfonate (PVS), sodium polystyrene sulfonate, copolymers of acrylamide with sodium vinylsulfonate, sodium acrylate or sodium styrene sulfonate, dextran sulfate, and anionic surfactants. Sodium polyacrylate with molecular weights of 1000-10,000 Da is a preferred polyanion of demonstrated utility. For PVS, higher molecular weights of <40,000 Da has shown utility; however, molecular weights of 1000-10,000 Da are preferred. It should be noted that other counterions such as ammonium, potassium, cesium or lithium, can be used in place of sodium for the species listed above, with ammonium, sodium and potassium being preferred counterions.

The anionic surfactant can be selected from the group consisting of sodium dodecyl sulfate, sodium lauryl sulfate, alcohol propoxy sulfate, olefin sulfonates, alpha olefin sulfonates, and the like.

The multivalent cationic crosslinker can be any multivalent cation(s) or source of cations that can be combined with a polymer for crosslinking, including but not limited to, zirconium compounds selected from the group consisting of zirconium acetate, sodium zirconium lactate, zirconium sulfate, zirconium tetrachloride, zirconium orthosulfate, zirconium oxychloride, zirconium carbonate, zirconium ammonium carbonate, zirconium acetylacetonate and mixtures thereof.

Chromium compounds, such as chromium chloride, chromium acetate, chromium propionate, chromium malonate, and the like can also be used. Alternatively, the multivalent cations crosslinker can be a compound selected from the group consisting of aluminum chloride, aluminum sulfate, aluminum citrate, tin chloride, tin sulfate, iron(III) chloride, iron(III) nitrate, iron(III) acetate, iron(III) citrate, titanium chloride, and titanium sulfate.

A preferred size for the PEC nanoparticles is <1 micron, or about 100 to 900 nm in diameter, or 100-500 nm. Larger sizes are also possible for certain applications.

The polymer that is crosslinked with the multivalent cations crosslinker in the gelant is a polymer that can be crosslinked with e.g., PEI or multivalent cations. Examples include partially hydrolyzed polyacrylamide (HPAM), and other anion or carboxyl group containing polymers. Other examples include a polymer or copolymers of acrylate with acrylamide, N,N-dimethyacrylamide, tert-butyl acrylate, 2-acrylamido-2-methylpropane sulfonic acid, sodium 2-acrylamido-2-methylpropane sulfonate, or N,N, dimethyl acrylamide. Other examples include polysaccharides, such as carboxylated guar and the like.

An improved method of sweeping a reservoir is also provided herein, wherein an injection fluid is injected into a reservoir to mobilize and produce oil, the improvement comprising injecting the PEC compositions herein described plus a polymer plus a fluid into a reservoir, aging said composition and polymer and fluid to increase its viscosity, injecting additional injection fluid into said reservoir to mobilize oil, and producing said oil. The aging time can be varied, as described herein, to allow complete penetration of the target zones in the reservoir.

Typically, the water-soluble polymer is pre-mixed with the polyelectrolyte gelling agent before injection. Alternatively, a solution of the water-soluble polymer can be pumped into the subterranean formation first, followed by water to displace the water soluble polymer from the well bore before introduction of the polyelectrolyte gelling agent. Thereafter, the polyelectrolyte gelling agent is pumped into the formation.

The nature of the subterranean formation is not critical to the practice of the processes described herein. The delayed gel-forming composition can be injected into said subterranean formation having a temperature range of from about 40° C. to about 180° C. Any means known to one skilled in the art such as, for example, pumps, can be used for injecting said gel-forming composition.

Another embodiment is a method of improving sweep efficiency of a fluid flood of a reservoir, said method comprising injecting the compositions herein described (plus polymer and fluid as needed) into a reservoir; aging the composition, e.g., 7 to 14 days or as needed, to increase its viscosity; injecting an injection fluid into said reservoir to mobilize the oil; and producing said mobilized oil.

We used PEI herein to exemplify the compositions, but PEI variations, such as polyalkyleneimine or a polyalkylenpolyamine can also be used as long as they are less than 26,000 Da.

We used HPAM herein as an exemplary polymer, but any acrylate based polymer can also be used, provided there are sufficient, unhindered carboxylate groups available for the multivalent cations crosslinking reaction. Preferred polymers include e.g., partially hydrolyzed polyacrylamide, polymers containing sodium acrylate and tert-butyl acrylate, 2-acryamido-2-methylpropane sulfonic acid, sodium 2-acryamido-2-methylpropane sulfonate (NaAMPS), N,N,-dimethyl acrylamide, and copolymers thereof. Other polymers include polysaccharide-based polymers, such as carboxylated guar or carboxymethyl cellulose.

In addition to the PEC nanoparticles, polymers and injection fluids described herein, the injection fluid may also contain other conventional additives including chelating agents to remove polymerization inhibitors, pH adjusters, initiators and other conventional additives, accelerators, retardants, corrosion inhibitors, scale inhibitors, as appropriate for the particular application. In addition, chemicals can be added that will reduce the adsorption of gelation chemicals to the oil reservoir.

As used herein, "ppm" refers to weight ratio in parts per million, based on total weight.

The term "nanoparticle" shall refer to particles, preferably less than about 1000 nanometers in size, even more preferably less than about 800 nanometers in size, and still more preferably less than 500 nanometers in size. In one aspect, the size of the nanoparticle ranges from about 50 to 500 nm, and is preferably between about 100 to 500 nm. When one refers to size in this art, it is typically an average size.

The term "polyelectrolyte" refers to a macromolecule, usually a polymer, possessing more than one charge. As used herein, the term "polyelectrolyte" includes polycations and polyanions.

The term "polymer" refers to a molecule built up by repetitive bonding together of smaller units called monomers. The polymer can be linear, branched network, star, comb, or ladder types of polymer. The polymer can be a homopolymer in which a single monomer is used or can be copolymer in which two or more monomers are used. Types of copolymers include alternating, random, block, and graft.

The term "polycation" refers to a polyelectrolyte possessing net positive charge. While the polycation can contain monomer units that are charge positive, charge neutral, or charge negative, the net charge of the polymer is positive.

The term "polyanion" refers to a polyelectrolyte containing a net negative charge. While the polyanion can contain monomer units that are charge negative, charge neutral, or charge positive, the net charge on the polymer is negative.

The term "polymeric core" shall refer to the inner part of the polyelectrolyte complex.

The term "polymeric shell" or "corona" refers to the outer layer of polyelectrolyte complex.

The term "associated with" means that the oil and gas field chemical is complexed with or partially or completely encapsulated by the polyelectrolyte complex. Thus, the oil and gas field chemical may interact with the exterior or interior surface of the polyelectrolyte complex (e.g. the corona or core).

The term "complex" means the interaction between two molecules or portions of the same molecule through non-covalent interactions such as coordination bonds, electrostatic interactions, hydrogen bonding interactions, and hydrophobic interactions.

The terms "partially or completely encapsulate" or "entrap" means that the oil and gas field chemical is partially or completely localized in the interior or center of the polyelectrolyte complex.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| Abbreviation | Meaning |
| --- | --- |
| AA | Sodium Acrylate |
| AC24 | Alcomer ® 24 |
| AN907 | Flopam ™ AN907 polyacrylamide based polymer |
| BPEI | branched PEI |
| Da | Daltons |
| DS | Dextran sulfate |
| EOR204 | Tiorco EOR204 medium molecular weight anionic polymer |
| FB | Field brine |
| HPAM | Hydrolyzed Poly-Acrylamide, partially hydrolyzed polyacrylamide |
| LPEI | Linear PEI |
| MW | Average molecular weight |
| PAA | Sodium polyacrylate (polyacrylic acid) |
| PEC | Polyelectrolyte complex |
| PEC0 | PECs made with 1% of 25kDs PEI |
| PEC39 | PECs made with 0.5% of 25kDs PEI |
| PEI | Polyethylenimine |
| PVS | poly(vinylsulfonic acid sodium salt) |
| RO | Reverse osmosis |
| SW | Sea water |
| VS | Vinylsulfonate |

BRIEF DESCRIPTION OF THE DRAWINGS

(FIG. 1B).

DETAILED DESCRIPTION

Figure 1A:
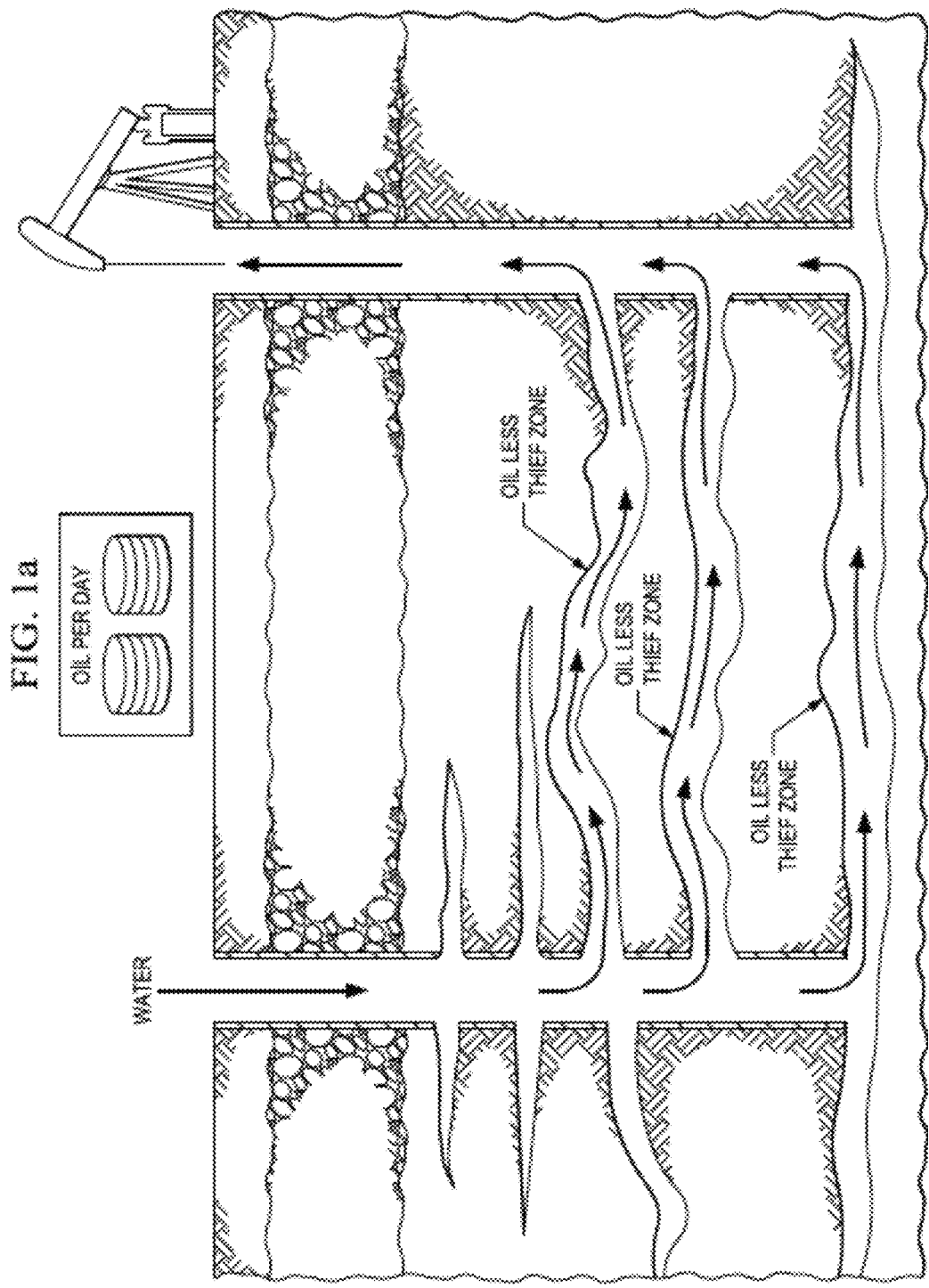
FIG. 1A-B. Water flooding wherein water bypasses oil, travelling the thief zones (FIG. 1A). However, the thief zones can be blocked by polymers, gels, foams, and the like, thus forcing water to sweep the reservoir and producing more of the original oil in place.
Figure 1B:
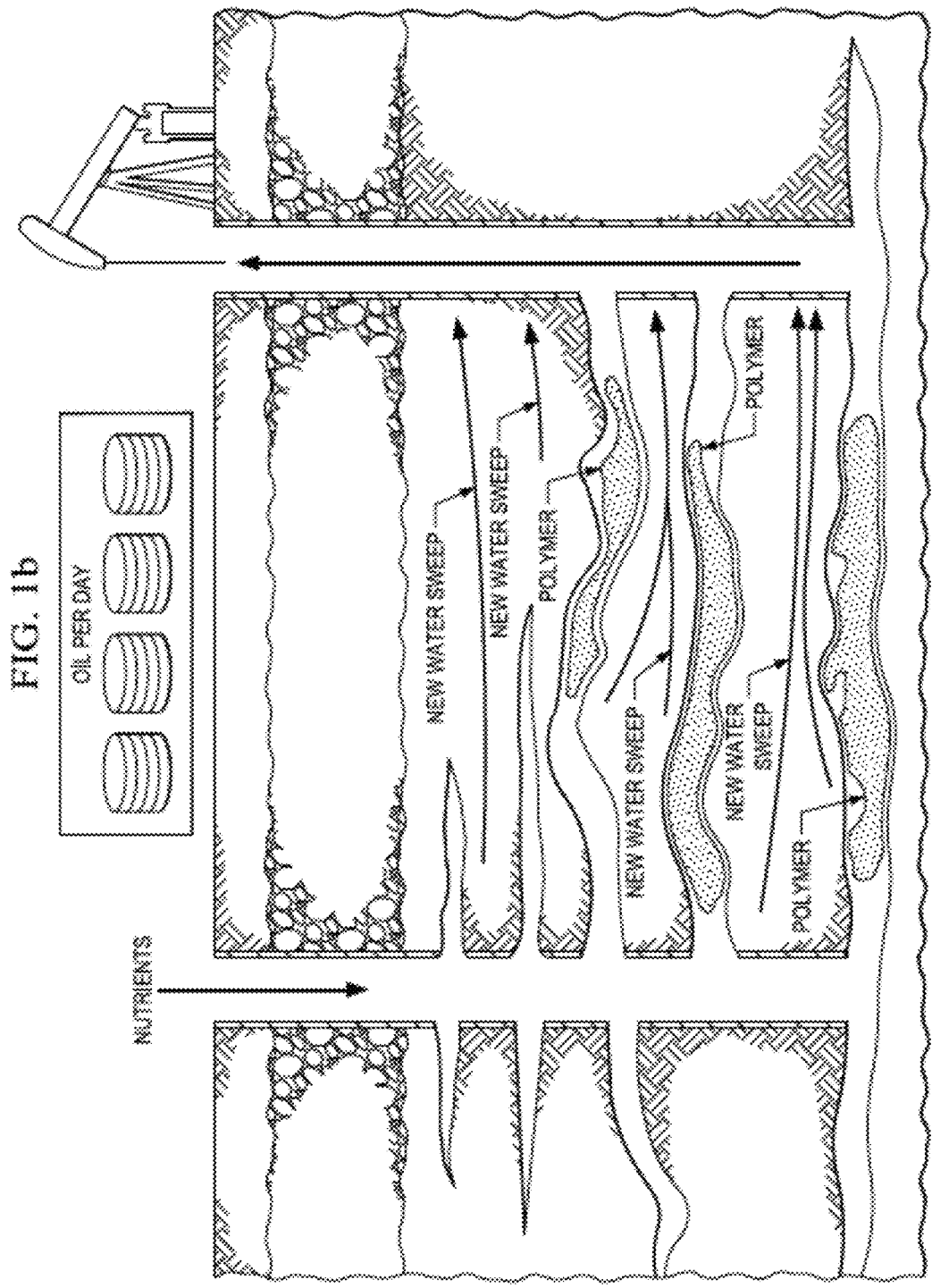

The disclosure provides novel polymer compositions that delay gelling under the conditions typical of water flooding in situ and have particular utility in blocking thief zones of reservoirs, but other uses are possible, especially in the agriculture, remediation and drug delivery arts.

Low molecular weight PEI or PEI derivatives are used together with a low molecular weight polyanion to hold multivalent cations in a nanoparticle, allowing the gradual release of the multivalent cations. These nanoparticles plus a polymer that can be crosslinked with the multivalent cations, and an injection fluid are injected into a reservoir. As time passes, multivalent cations are released from the nanoparticles and crosslink the polymer. Thus, the multivalent cations release (and consequent gel formation) can be delayed until the injection fluid has reached the target zones deep into the reservoir.

The disclosed compositions and methods comprises one or more of the following embodiments, in any combination thereof:

A composition comprising a polyelectrolyte complex nanoparticle less than one micron in size having a polyalkylenimine of less than 26,000 Da, and a polyanion of less than 10,000 Da.

A composition comprising a polyelectrolyte complex nanoparticle less than one micron in size having a polyalkylenimine of less than 26,000 Da, and a polyanion of less than 40,000 Da.

A composition comprising a polyelectrolyte complex nanoparticle less than one micron in size having a polyalkylenimine of less than 26,000 Da, and a polyanion of less than 10,000 Da.

A composition comprising a polyelectrolyte complex nanoparticle between 100 and 500 nm in size, a polyalkylenimine of less than 26,000 Da, and a polyanion of less than 10,000 Da.

A composition comprising a polyelectrolyte complex nanoparticle less than one micron in size having a polyalkylenimine and sodium polyacrylate.

A composition comprising a polyelectrolyte complex nanoparticle between 100 and 500 nm in size having a polyalkylenimine and sodium polyacrylate.

A composition comprising a polyelectrolyte complex nanoparticle having an average size of less than one micron that facilitates delivery of an oil and gas chemical to a reservoir, wherein a polyethylenimine of less than 26,000 Da and a polyanion of less than 10,000 Da are intimately associated with an oil and gas field chemical to form the polyelectrolyte complex nanoparticle.

A composition for controlled release of an oil and gas field chemical comprising a polyanion of less than 10,000 Da and a polyethylenimine of less than 26,000 Da forming a polyelectrolyte complex with an average particle size of less than 1000 nm wherein the polyelectrolyte complex is intimately associated with an oil and gas chemical consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a gel breaking agent, and (h) a surfactant.

In any of the above compositions, the preferred polyalkylenimine can be polyethylenimine. The polyanion can be sodium polyacrylate, sodium polyvinyl sulfonate, poly(sodium styrene sulfonate), copolymers of sodium acrylate with acrylamide, sodium vinylsulfonate or sodium styrene sulfonate, dextran sulfate, or anionic surfactants. Examples of possible anionic surfactant for use in the invention including sodium dodecyl sulfate, sodium lauryl sulfate, alcohol propoxy sulfate, olefin sulfonates, and alpha olefin sulfonates. In some embodiments, the preferred polyacrylate is sodium polyacrylate.

The PECs in the above compositions can be intimately associated with at least one multivalent cation crosslinker having Zr(IV), Cr(III), Ti(IV), Fe(III) or ARM). Examples of such crosslinkers include zirconium acetate, sodium zirconium lactate, zirconium sulfate, zirconium tetrachloride, zirconium orthosulfate, zirconium oxychloride, zirconium carbonate, zirconium ammonium carbonate, zirconium acetylacetonate, chromium acetate, chromium propinonate, chromium malonate, chromium malate, chromium chloride, aluminum chloride, aluminum sulfate, aluminum citrate, tin chloride, tin sulfate, iron (III) chloride, iron (III) nitrate, iron (III) sulfate, iron (III) acetate, iron (III) citrate, titanium chloride, and/or titanium sulfate. In other embodiments, the PEC entraps the multivalent cation.

In some embodiments, the above compositions can also include monovalent or divalent cations, such as sodium, potassium, magnesium, and calcium.

A composition comprising a polyelectrolyte complex nanoparticle having a polyethylenimine (PEI) of less than 26,000 Da and a sodium polyacrylate of less than 10,000 Da intimately associated with a chromium ion crosslinker, said nanoparticle having a size of less than one micron, wherein said nanoparticle has a predominance of negative charges and the amount of sodium polyacrylate exceeds the amount of PEI.

A composition comprising a polyelectrolyte complex nanoparticle having a polyethylenimine (PEI) of less than 26,000 Da and a sodium polyvinyl sulfonate of less than 10,000 Da intimately associated with a chromium ion crosslinker, said nanoparticle having a size of less than one micron, wherein said nanoparticle has a predominance of negative charges and the amount of sodium polyvinyl sulfonate exceeds the amount of PEI.

A composition comprising a polyelectrolyte complex nanoparticle having a polyethylenimine (PEI) of less than 26,000 Da and sodium polyacrylate of less than 10,000 Da intimately associated with a Cr(III) or Fe(III) ion crosslinker, said nanoparticle having a size of less than one micron, wherein said nanoparticle has a predominance of positive charges and the amount of PEI exceeds the amount of sodium polyacrylate.

A composition comprising a polyelectrolyte complex nanoparticle having a polyethylenimine (PEI) of less than 26,000 Da and sodium polyvinyl sulfonate of less than 10,000 Da intimately associated with a Cr(III) or Fe(III) ion crosslinker, said nanoparticle having a size of less than one micron, wherein said nanoparticle has a predominance of positive charges and the amount of PEI exceeds the amount of sodium polyvinyl sulfonate.

A composition comprising a polyelectrolyte complex nanoparticle having a polyethylenimine (PEI) of less than 26,000 Da and a polyanion of less than 10,000 Da intimately associated with at least one multivalent cation crosslinker, wherein said polyanion is selected from sodium polyacrylate, sodium polyvinyl sulfonate, poly(sodium styrene sulfonate), copolymers of sodium acrylate with acrylamide, sodium vinylsulfonate or sodium styrene sulfonate, dextran sulfate, and anionic surfactants, and where the at least one multivalent cation crosslinker is selected from aluminum(III), iron (III), titanium(IV), chromium(III), zirconium(IV) and complexes of same.

An improved method of sweeping a reservoir, wherein an injection fluid is injected into a reservoir to mobilize and produce oil, the improvement comprising injecting any of the above compositions plus a polymer plus a fluid into a reservoir, aging the composition and polymer to increase its viscosity, injecting additional injection fluid into said reservoir to mobilize oil, and producing said oil.

A delayed gelling composition comprising any of the above compositions, a polymer that can be crosslinked with any of the above compositions and a fluid. The fluid can be brine, seawater, river or lake water, or produced water.

The polymer can have anionic sites that crosslink with at least one multivalent cation crosslinker used in the above compositions. In some embodiments, the polymer is a polymer or copolymers of acrylate, acrylamide, N,N-dimethyacrylamide, tert-butyl acrylate, acryamido-2-methylpropane sulfonic acid, sodium 2-acryamido-2-methylpropane sulfonate, or N,N, dimethyl acrylamide.

A method of improving sweep efficiency of a fluid flood of a reservoir, said method comprising: injecting any of the delayed gelling compositions described above into a reservoir, aging the composition to increase its viscosity, injecting an injection fluid into said reservoir to mobilize the oil, and producing said mobilized oil.

The present disclosure is exemplified with respect to the examples and figures below. The following examples are intended to be illustrative only, and not unduly limit the scope of the appended claims

Materials

Reagent grade chemicals were obtained from Fisher Scientific (Morris Plains, N.J.). Polyethylenimine (Mw=25 kDa & 800 Da) and polyvinyl sulfonic acid (PVS) (sodium salt, 25 wt %, Mw=4-6 kDa) were obtained from Sigma Aldrich (St. Louis, Mo.). Other polyanions (PAAs) were, Nuosperse FX605 PAA from Elementis and $CrCl_3$ (as 12.3% Cr(III)) from McGean. Commercial grade product of PEI used in these below tests were Lupasol-WF PEI25k, obtained from BASF.

Reagents were used as supplied and all aqueous solutions were prepared in 18 MΩ/cm reverse osmosis (RO) water from a WaterPro/RO/PS unit (Labconco, Kansas City, Mo.).

Partially hydrolyzed polyacrylamide (HPAM) was obtained from a variety of sources (Table 1). Typically, 2% HPAM polymer stock solutions were prepared in 1.5% NaCl+400 ppm $NaN_3$ solution and passed through a 5 μm nylon filter before use.

TABLE 1

Identity, supplier and characteristics of HPAM used in these studies

| Name | Alcoflood AF935 | Alcomer24 AC24 | AN907 | AN905 | EOR204 | Alcoflood AF254S |
|---|---|---|---|---|---|---|
| Provider | Ciba Specialty Chemicals | BASF | SNF | SNF | Tiorco | Allied Colloids |
| $M_w$ | 6 MDa | 6.6 MDa | 10-13 MDa | 8-10 MDa | 10-12 MDa | 300-500 KDa |
| Degree of Hydrolysis | 5-10% | 10% | 7% | 5% | 12% | <4% |

Brines

Synthetic field brines and seawater used in the preparation of PECs and gelants were prepared according to the recipes in Table 2. To avoid precipitation during storage, $NaHCO_3$ was either omitted or added immediately prior to use:

TABLE 2

Synthetic brines

|  | Brine A, g/L | Brine B, g/L | North Sea Water SW, g/L |
|---|---|---|---|
| NaCl | 26.22 | 35.74 | 22.64 |
| KCl | 0.166 | 0.298 | 0.763 |
| $CaCl_2 \cdot 2H_2O$ | 0.444 | 32.28 | 1.72 |
| $MgCl_2 \cdot 6H_2O$ | 1.414 | 4.35 | 11.24 |
| $Na_2SO_4$ | 0.37 | — | 3.57 |
| $NaHCO_3$* | 2.232 | 0.20 | 0.22 |
| TDS | 30,000 ppm | 62,640 ppm | 33,746 ppm |

*Omitted or added immediately before use

PEC Preparation and Characterization

Polyelectrolyte complexes (PECs) were prepared by mixing dilute solutions of a polyanion (PAA), a polycation (PEI) and a multivalent cation ($Cr^{3+}$ or $Fe^{3+}$) in sequence while stirring vigorously with a magnetic stirrer. Typically, the larger volume of the two polyelectrolyte stock solutions was placed in a 100 mL beaker and stirred at 1200 $min^{-1}$. While stirring, the oppositely-charged polyelectrolyte was added rapidly from a syringe fitted with a 16 gauge hypodermic needle. Finally, the multivalent cation stock solution was added from another syringe fitted with a 23 gauge needle.

Particle size & zeta potential: Particle size was estimated from dynamic light scattering using a Brookfield Nano-Brook Omni instrument. Four drops of the PEC complexes were diluted with RO water in a 1 cm square polystyrene cuvette. Three one minute measurements of light scattering at 90° were taken to calculate the particle size distribution, mean effective diameter and polydispersity.

Zeta potential is a measure of the magnitude of the electrostatic or charge repulsion/attraction between particles, and is one of the fundamental parameters known to affect stability. The magnitude of the zeta potential indicates the degree of electrostatic repulsion between adjacent, similarly charged particles in a dispersion. For molecules and particles that are small enough, a high zeta potential will confer stability, i.e., the solution or dispersion will resist aggregation. When the potential is small, attractive forces may exceed this repulsion and the dispersion may break and flocculate. So, colloids with high zeta potential (negative or positive) are electrically stabilized while colloids with low zeta potentials tend to coagulate or flocculate, as shown in the table:

| Zeta potential [mV] | Stability behavior of the colloid |
|---|---|
| from 0 to ±5, | Rapid coagulation or flocculation |
| from ±10 to ±30 | Incipient instability |
| from ±30 to ±40 | Moderate stability |
| from ±40 to ±60 | Good stability |
| more than ±61 | Excellent stability |

Zeta potential was measured in the same instrument. Two to four drops of the PEC complexes were diluted to 1.4 mL with 1 mMol/L KCl solution in a cuvette. Electrophoretic mobility was used to calculate zeta potential using the Smoluchowski approximation. Three consecutive measurements were averaged for each sample.

Multivalent cations entrapment efficiency: A sample of the PEC complex was centrifuged at 14,000 G for 30-90 minutes. The concentrations of multivalent cations were measured in the whole suspension and in the supernatant and the entrapment efficiency calculated from:

Entrapment Efficiency $$EE = ([M]_0 - [M]_s)/[M]_0 \quad \text{Equation 1:}$$

Where EE is the entrapment efficiency (expressed as a fraction or multiplied by 100 to give %), $[M]_0$ is the concentration of multivalent cations in the PEC suspension, and $[M]_s$ is the concentration of multivalent cations in the supernatant.

For the multivalent cation determination, samples were analyzed by inductively-coupled plasma optical emission spectrometry (ICP-OES) using the following procedure:

1. Add 400 μL 30% hydrogen peroxide to a 200 μL sample of PEC
2. Heat to 70-75° C. for 3 h
3. Add 1000 μL concentrated nitric acid
4. Heat to 70-75° C. for 1 h
5. Dilute to 10 mL with RO water (50× dilution factor)

The chromium and/or iron concentration was determined using a PerkinElmer (Waltham, Mass.) ICP-OES instrument according to standard operating procedures, wherein the presence of Cr(III) was detected at 276.7 nm and Fe(III) at 238.2 nm.

Alternatively, for the multivalent cations determination of chromium, samples were analyzed colorimetrically by oxidizing Cr(III) to Cr(VI) using the following procedure:

1. Weigh 0.5-1 mL sample and add 1 mL 30% hydrogen peroxide
2. Heat to 70-75° C. for 30 minutes
3. Add 1 mL of 1N KOH and 5-10 mL RO water and weigh to find dilution factor
4. Determine optical absorbance at 373 nm For the Total organic carbon/total nitrogen (TOC/TN) characterization, PEC samples were analyzed as follows:

1. Prepare phosphoric acid stock solution (as used in the TOC/TN instrument) by mixing 18 mL concentrated phosphoric acid and 94 mL RO water. 50× diluted phosphoric acid was prepared by mixing 20 mL of the stock solution with 1000 mL of RO water.
2. Prepare samples by adding 200 mL PEC sample to an EPA vial and diluting to 20 g with diluted phosphoric acid (from 1 above to give 50× dilution factor)

TOC and TN were measured in a Teledyne Tekmar Torch instrument according to standard operating procedures.

Gelation of HPAM by PECs

After characterizations, the PECs were mixed with a HPAM source and a brine to form a gelant according to some embodiments of the present disclosure.

Gelant preparation: PECs, HPAM stock solution and synthetic brine were mixed together in an anaerobic chamber to a predetermined concentration of HPAM and PEC to form a "gelant". Typically, the PEC concentration is expressed as ppm multivalent cations, though the PEI also plays a substantial role in the gelation process.

The gelant was aliquoted into a number of glass vials and sealed by crimping the foil and PTFE caps. The vials were placed in ovens or heating blocks at the desired incubation temperature and incubated under anaerobic conditions to prevent oxidative degradation of the polymer. The initial viscosity was measured and vials were opened at aging intervals to test the viscosity development.

Viscosity measurement: Viscosity profiles of the gelants were measured using a Brookfield DV-II+ Pro viscometer (Brookfield Engineering, Middleboro, Mass.) fitted with a CP40 cone and plate. Viscosity was measured at 25° C. at the lowest shear rate that gave a reliable reading (i.e. >10% of available torque and <maximum viscosity available at that shear rate). Gelation was considered to have occurred when the viscosity exceeded 1032 cp at 2.25 $s^{-1}$, which is the highest value that can be measured by the instrument in this configuration.

Gel strength: After the gelant had gelled according to the viscosity measurement, it generally continued to develop a stronger gel structure. To capture this behavior, the gels were also assigned a score on the Sydansk Gel Code scale (SPE 153241 Advanced Technology Series, Vol. 1). To facilitate a graphical representation of this information, a numeric code, displayed in Table 3 was also used, where A=0, B=1 . . . J=9.

TABLE 3

Sydansk Gel Codes used to describe strength of HPAM-PEC gels (SPE 153241)

| Sydansk Gel Code | Numeric Equivalent | Description |
|---|---|---|
| A | 0 | No detectable gel formed |
| B | 1 | Highly flowing gel |
| C | 2 | Flowing gel |
| D | 3 | Moderately flowing "tonguing" gel |
| E | 4 | Barely flowing gel |
| F | 5 | Highly deformable non-flowing gel |
| G | 6 | Moderately deformable non-flowing gel |
| H | 7 | Slightly deformable non-flowing gel |
| I | 8 | Rigid gel |
| J | 9 | Ringing rigid gel |

Retention in sandpacks: Sandpack trials were carried out using crushed Berea outcrop material. The sand was dry sieved and the fraction between 48 and 270 mesh was retained for use. Glass sandpack holders with heated water jackets were used for temperature control.

Before injection of gelant, sandpacks were flooded with Brine A at 5 ml/min and pressure drop across the sandpack was measured to determine permeability to brine under constant head using Darcy's law:

Calculating Permeability According to Darcy's Law $$k = (\mu \times L \times Q)/(A \times \Delta P) \quad \text{Equation 2:}$$

where: µ=viscosity, centipoise (cP); L=length of sandpack, cm; Q=flow rate, cm³/s; A=cross-sectional area of sandpack, cm²; ΔP=pressure drop across sandpack, atm Homogeneity and pore volume of sandpacks was confirmed by injecting tracer (brine+1% KNO₃) and plotting tracer concentration versus volume injected. The nitrate tracer was detected in the effluent by measuring optical absorbance at 302 nm. Prior to further use of the sandpack, the tracer was displaced by brine.

For the gelant injection, sandpacks were connected to a circulating water bath and were allowed to reach the target temperature of 65° C. Gelant was prepared as described above and loaded into a 60 mL plastic syringe with a polyethylene plunger. The gelant was injected into the sandpack at 5 mL/min using a programmable syringe pump. The pressure drop profile was recorded across the sandpack to allow apparent viscosity to be calculated. During injection, effluent fractions were collected in numbered 2 mL polypropylene microcentrifuge tubes for further analysis.

Post-gelant brine flood: After an overnight shut-in at 65° C. temperature, the sandpack was flooded with brine at constant flow of 5 mL/min.

Effluent analysis: Injected gelant and representative effluent samples were analyzed for multivalent cations concentration by ICP-OES as previously described. Concentration was normalized to the injected concentration and plotted against number of pore volumes injected, along with the previously measure tracer breakthrough curve. The shape of the breakthrough curve is an important indicator of the degree of retention and adsorption. Any delay in breakthrough is easily seen by comparing to the tracer curve.

A mass balance calculation was performed by summing the mass of multivalent cations injected and produced (interpolating samples that were not measured) and dividing by the mass of sand in the sandpack. This retention value was expressed as µg of multivalent cations per gram of sand.

Cr(III)-PEC concentration and re-suspension: Since the PEC formulation method requires the reagents to be dissolved in fresh water at relatively low concentrations, it is desirable to concentrate the final PEC suspension for ease of storage, transportation and use.

Two methods were used to concentrate the samples. The initial trials were performed in a vacuum oven without temperature control. Later trials were performed with the rotary evaporator at elevated temperature. The rotary evaporator method has the advantage of being much quicker, especially at higher temperatures; however, either method works.

Concentration Method 1: Samples were placed in 20 mL glass vials or 50 mL polypropylene centrifuge tubes in a vacuum oven at ambient temperature. The sample containers were covered with Parafilm, which was pierced multiple times with a 23 gauge hypodermic needle to allow the escape of water vapor without loss of liquid during boiling. Temperature was neither controlled nor monitored, but was below room temperature due to latent heat of evaporation.

Concentration Method 2: 40 mL samples were dried in a rotary evaporator under vacuum at elevated temperature.

Re-suspension: Following the concentration step, samples were diluted back to their original volume with brine.

Re-suspended samples were studied (size, zeta potential, gelation behavior with HPAM) and characterized according to the methods described above.

Results

PEI/PAA/Cr PEC

The initial approach to incorporating PAA into PECs was to recreate the stoichiometric charge ratio seen in a previously developed PEI/PVS/Cr(III) formulation in US20140209305 by multiplying the polyanion stock concentration by the ratio of the formula weights of vinylsulfonate (VS) and sodium acrylate (AA) to maintain and keep stoichiometric ratios of PEI, polyanion and multivalent cation without changing the overall mass. The formula weights are VS=130.1, AA=94.05; PVS: PAA=1.38:1=1:0.723 and the concentration of PAA in stock solution was thus reduced to 0.6125×0.723=0.443%.

For later formulations, the PEI concentration and pH, PAA concentration and multivalent cation concentration were varied. Some representative formulations (Cr(III)-PEC0 and Cr(III)-PEC39) were selected for further study based on results of particle characterization (size, zeta potential and entrapment efficiency). Tables 4 and 5 detail the formulation and initial PEC characterization studies for Cr(III)-PEC0 and Cr(III)-PEC39.

TABLE 4

Cr(III)-PEC formulations

|  | 0.443% PAA 5.1 kDa | 1% PEI 25 kDa pH 10.5 | 19.5k ppm Cr(III) as 10% CrCl₃•6H₂O |
|---|---|---|---|
| Cr(III)-PEC0 | 3.48 g | 21.0 g | 0.72 g |
|  | 0.222% PAA 5.1 kDa | 0.5% PEI 25 kDa pH 9.55 | 19.5k ppm Cr(III) (from 12.3%) |
| Cr(III)-PEC39 | 3.48 | 15.2 | 0.49 |

TABLE 5

Typical PEC characterizations

|  | [Cr(III)], ppm | pH | Size, nm | Zeta potential, mV | Entrapment Efficiency, % |
|---|---|---|---|---|---|
| Cr(III)-PEC0 | 560 | 8.9 | 89 | 32 | >90 |
| Cr(III)-PEC39 | 499 | 7.5 | 333 | 49.8 | 98 |

Effect of PAA molecular weights: To examine the effect of PAA molecular weight on the PECs, the PEI/PAA/Cr-0 formulation initially made with 5.1 kDa of PAA was replicated using equivalent concentration of PAA at different molecular weights. Stock concentrations were manipulated to account for whether the PAA was supplied as the acid or as the sodium salt and recipes for which are in Table 6.

TABLE 6

PEC formulations using different molecular weight PAA

| Polyanion stock | PAA stock pH | PAA stock viscosity, cp | PAA stock, g | 1% PEI 25 kDa pH 10.5, g | 10% CrCl₃•6H₂O, g |
|---|---|---|---|---|---|
| 0.335% PAA 2 kDa | 3.0 | 1.03 | 3.48 | 21.0 | 0.72 |
| 0.443% PAA-Na 5.1 kDa* | 8.1 | 1.04 | 3.48 | 21.0 | 0.72 |
| 0.335% PAA 100 kDa | 2.9 | 1.19 | 3.48 | 21.0 | 0.72 |

TABLE 6-continued

PEC formulations using different molecular weight PAA

| Polyanion stock | PAA stock pH | PAA stock viscosity, cp | PAA stock, g | 1% PEI 25 kDa pH 10.5, g | 10% CrCl$_3$·6H$_2$O, g |
|---|---|---|---|---|---|
| 0.335% PAA 250 kDa | 3.1 | 1.48 | 3.48 | 21.0 | 0.72 |
| 0.335% PAA 1.25 MDa | 3.2 | >1032 | 3.48 | 21.0 | 0.72 |

*0.443% PAA ≡ 0.335% as acid

Figure 2:
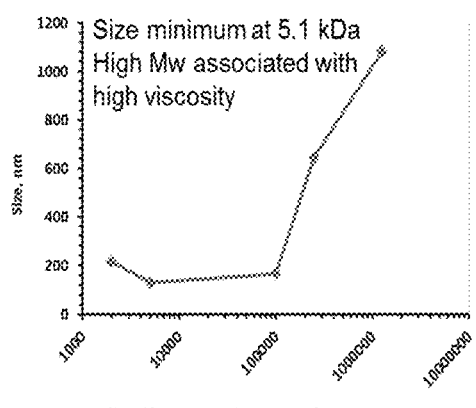
FIG. 2. Characterization of PEI/PAA/Cr(III)-PEC0 made with PAA of different molecular weights.
Figure 2:
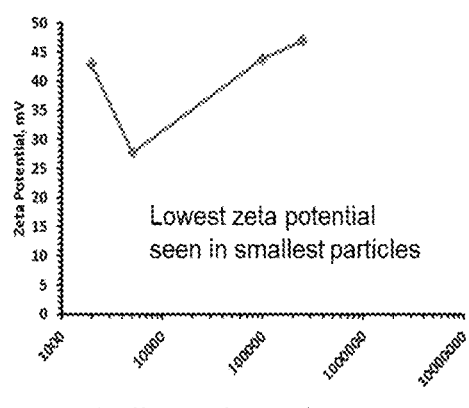
Figure 2:
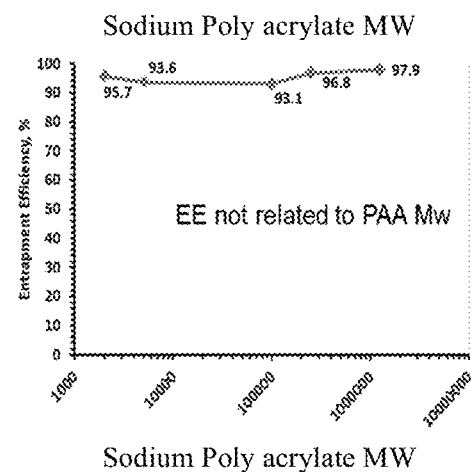
Figure 2:
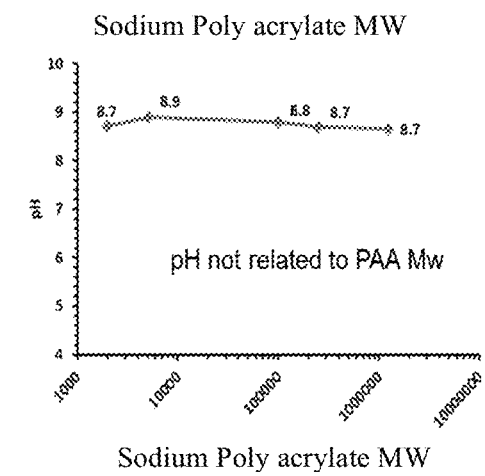

FIG. 2 displays the characterization data for each PECs such as size, zeta potential, multivalent cation entrapment efficiency and pH. As can be seen, the multivalent cation entrapment efficiency and pH did not vary much. However, the lowest zeta potential was seen in the smallest PECs, which had a PAA molecular weight of approximately 2-500 kDa.

Effect of PAA 5.1 kDa concentration: Multiple batches of Cr(III)-PEC0 (21 g of 1% PEI+3.48 g of PAA stock+0.72 g of 10% CrCl$_3$.6H$_2$O) were assembled with different final concentrations of PAA 5.1 kDa to determine how the PAA concentration affected the PECs. To maintain the final volume and concentrations of PEI and Cr(III), the PAA stock solution concentrations were varied according to Table 7.

TABLE 7

Dilutions of PAA stock solution used to maintain final concentration of PEI and Cr(III) in PECs

| PAA stock solution | [PAA] stock, ppm |
|---|---|
| 1x dilution | 3345 |
| 2x dilution | 1673 |
| 5x dilution | 669 |
| 10x dilution | 334 |
| 25x dilution | 133 |

Figure 3:
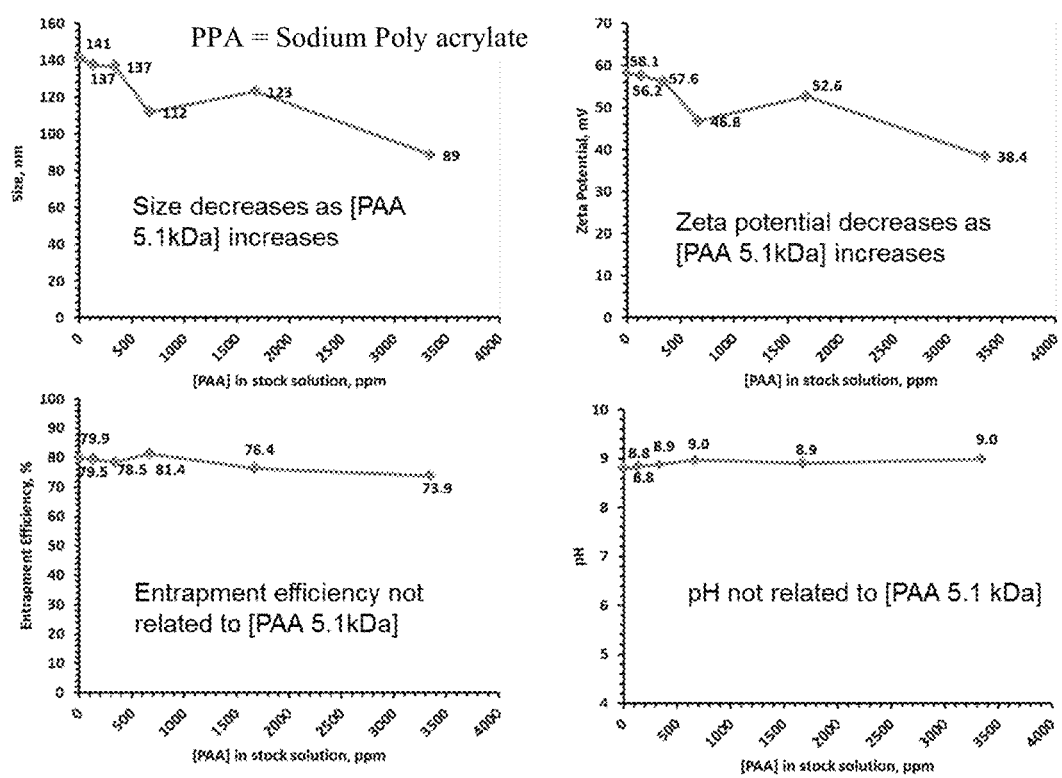
FIG. 3. Characterization of PEI/PAA/Cr(III)-PEC0 with different concentrations of PAA with a molecular weight of 5.1 kDa.

FIG. 3 displays the characterization data for each of these PECs, such as size, zeta potential, multivalent cation entrapment efficiency and pH. As can be seen, the multivalent cations entrapment efficiency and pH did not vary much and are not considered to be affected by the PAA. However, both size and zeta potential decreased with increasing final concentrations of PAA at 5.1 kDa.

Once PECs were assembled, they were combined with various sources of an exemplary oilfield polymer, partially hydrolyzed polyacrylamide (HPAM), to monitor viscosity and gelation.

Figure 4:
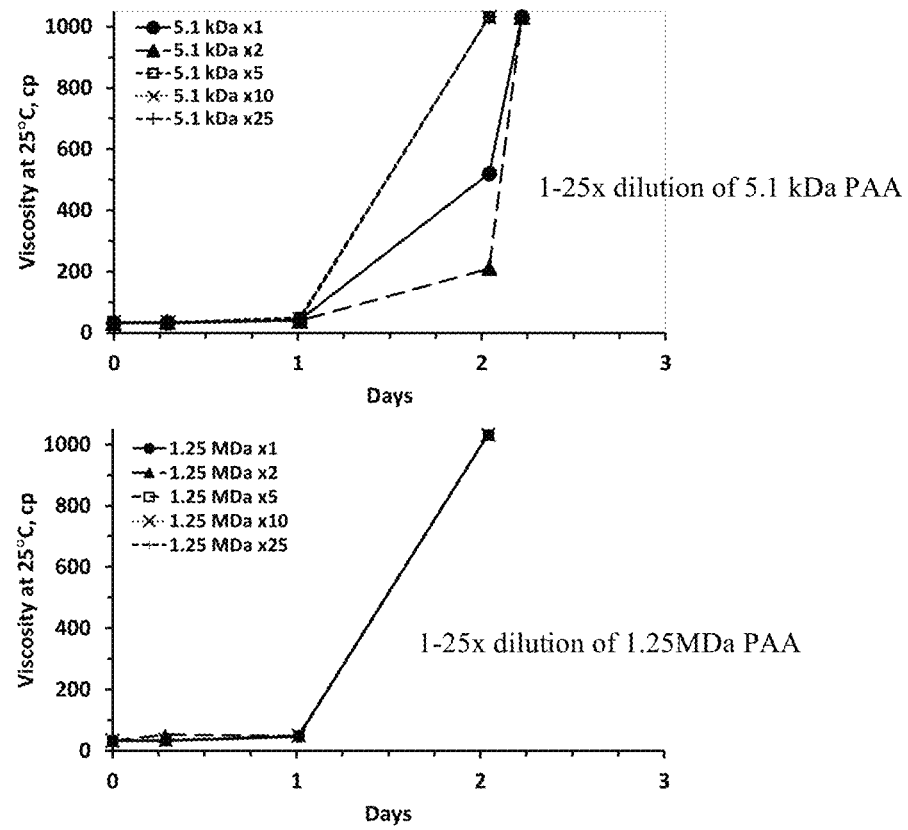
FIG. 4. Viscosity profiles of AC24 and PEC gelants with different molecular weights of PAA measured at 25° C. The gelants contain 5000 ppm AC24 and 100 ppm Cr(III) in Brine A incubated at 65° C. Gelation slightly slower with higher molecular weight PAA [Mw=5.1 kDa].
Figure 5:
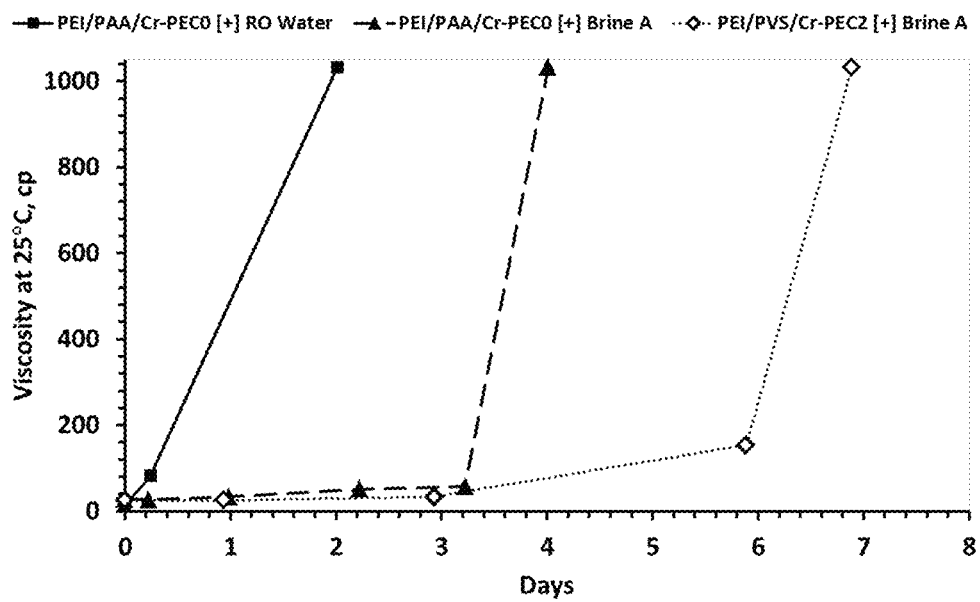
FIG. 5. Viscosity profiles of PEI/PAA/Cr(III)-PEC0 [+] in RO water and Brine A and PEI/PVS/Cr(III)-PEC2 [+] in Brine A incubated at 65° C. and measured at 25° C. Gelant contains 5000 ppm AC24 and 100 ppm Cr(III).

Gelation of PEI/PAA/Cr(III)-PEC0 and AC24:

FIGS. 4 and 5 display viscosity profiles of PECs mixed with AC24 as the source for HPAM and 100 ppm Cr(III) in either RO water or Brine A to form a gelant. The gelant was incubated at 65° C.

In FIG. 4, PECs with differing concentrations of PAA at both 5.1 kDa and 1.25 MDa were studied. The average gelation time was only 1 day for these gelants. In FIG. 5, the gelation time increased by using brine A instead of water as the injection fluid in the gelant. Furthermore, switching the PAA to PVS saw an increase in gelation time.

Gelation of PEI/PAA/Cr(III)-PEC39 1+1 and EOR204 in Brine A at 65° C.: Cr(III)-PEC39 was found to be suitable for use with a wider range of HPAMs than Cr(III)-PEC0, at the cost of a lower chromium loading. Further work is being conducted to mitigate this limitation on chromium loading by concentrating the PEC suspension to allow for ease of handling, transportation and use.

Figure 6A:
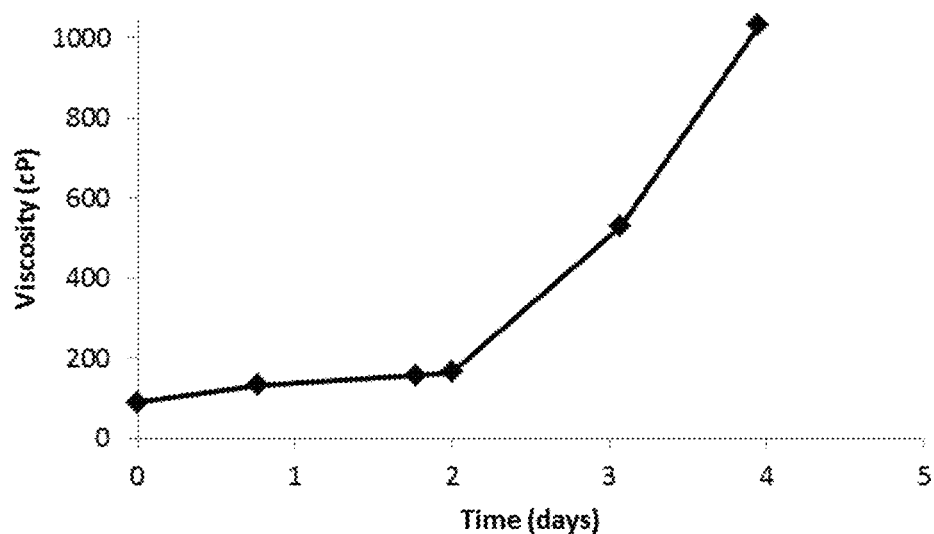
FIG. 6A. Viscosity profiles of PEI/PAA/Cr(III)-PEC39 [+] in Brine A incubated at 65° C. and measured at 25° C.
Figure 6B:
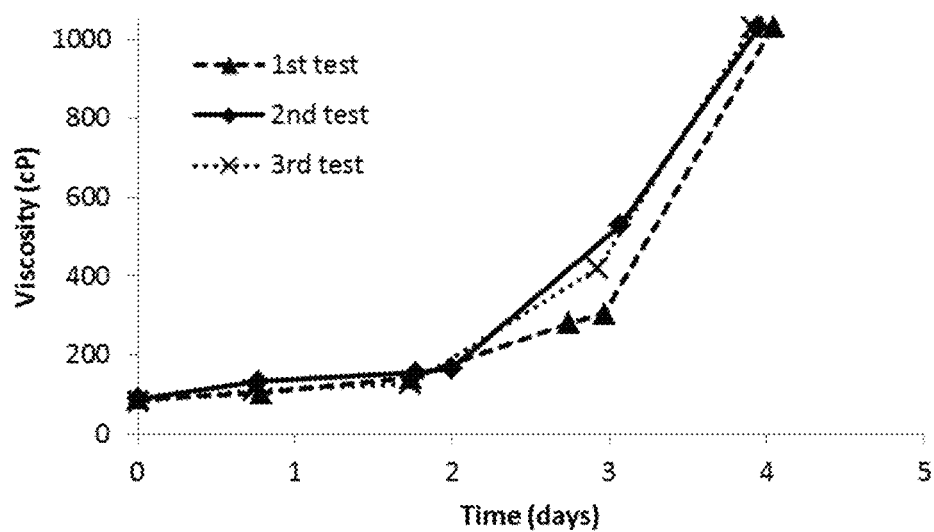
FIG. 6B. Reproducibility of gelation tests of PEI/PAA/Cr(III)-PEC39 [+] in Brine A measured at 25° C. Gelant contains 5000 ppm EOR204 and 100 ppm Cr(III) supplied as PEI/PAA/Cr(III)-PEC39 [+].

FIG. 6A shows the initial viscosity profile of PEI/PAA/Cr-39 [+] mixed with EOR204 as the HPAM source in Brine A. The final concentration of Cr(III) in the gelant was 100 ppm. As expected, the PECs delayed the gelation by four days. To confirm the reproducibility of the gelation for PEI/PAA/Cr-39 [+] and EOR204 in Brine A at 65° C., a total of three gelation tests were carried out using independently-prepared batches of Cr(III)-PEC39 to ensure that the gelation delay was repeatable. The results are shown in FIG. 6B.

Figure 7:
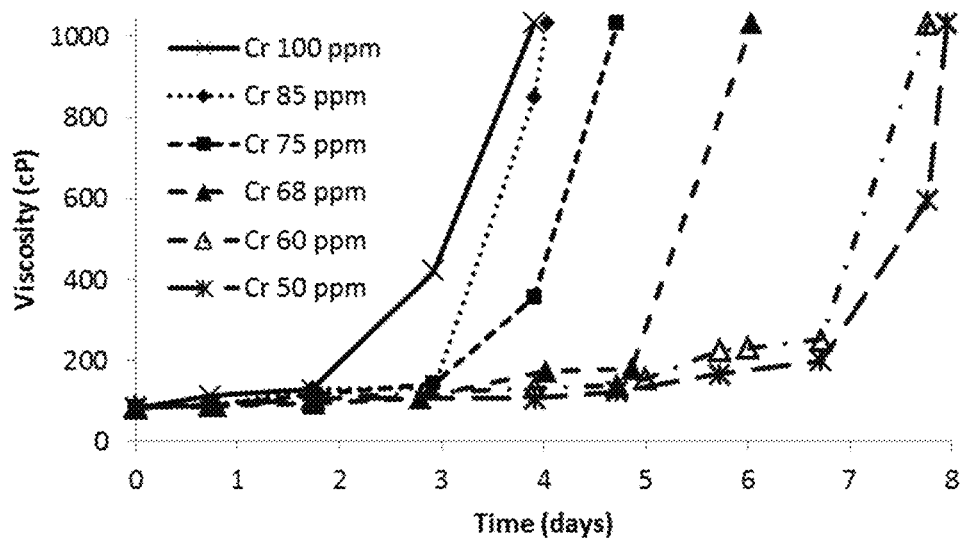
FIG. 7. Gelation of PEI/PAA/Cr(III)-PEC39 [+] in Brine A at 65° C. with a gelant containing 5000 ppm EOR204 and 100, 85, 75, 68, 60, or 50 ppm Cr(III) supplied as PEI/PAA/Cr(III)-PEC39 [+].

The effects on gelation time of varying concentration of chromium, i.e. by changing the amount of PECs, was examined and the results are shown in FIG. 7. As expected, gelation was delayed with decreasing chromium concentration.

Figure 8:
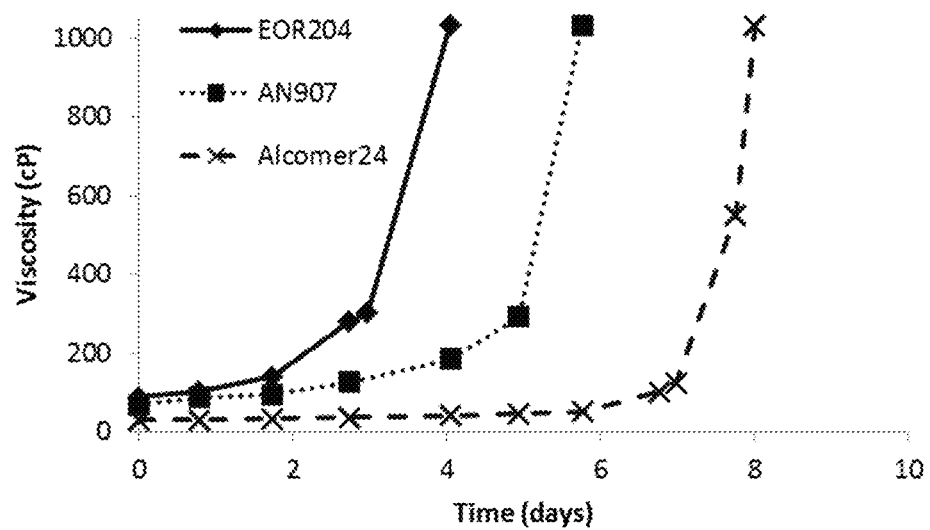
FIG. 8. Gelation of PEI/PAA/Cr(III)-PEC39 [+] in Brine A at 65° C. with different sources of HPAM. Gelants contain 5000 ppm HPAM from EOR204, AN907, and Alcomer 24; and 100 ppm Cr(III) supplied as PEI/PAA/Cr(III)-PEC39 [+].

The effects on gelation time of using different sources of HPAM were also examined and the results are shown in FIG. 8. Gelation time for EOR204, AN907, and Alcomer 24 are 4, 5.8, and 8 days respectively. EOR204 has the shortest gelation time due to its higher molecular weight (10-12 MDa) and high degree of hydrolysis (~12%). Gelation time of AN907 is shorter than Alcomer 24 because the molecular weight of AN907 (10-13 MDa) is higher than that of Alcomer 24 (6.6 MDa).

Concentration and Re-Suspension of Cr(III)-PECs

Concentrating PEI25k/PAA5.1 k/Cr(III)-PEC0—Initial Trial

PEI (25 kDa)/PAA (5.1 kDa)/Cr-0 PECs were concentrated by drying to lower water content, and then re-suspended in Brine A. Several samples were evaporated at ambient temperature in 20 mL glass vials in a vacuum oven. The vials were covered with Parafilm, which was pierced multiple times with a 23 gauge hypodermic needle to allow the escape of water vapor without loss of liquid during boiling.

Samples that had been concentrated to different final masses were re-suspended in Brine A (no bicarbonate) to their original concentration. At the highest concentration factor, no free water was visible before the addition of brine and the PECs formed a blue film on the inside of the glass vial. Re-suspended PECs were characterized (size, zeta potential) and the results are shown in Table 8.

TABLE 8

Characterization of Cr(III)-PEC0 after vacuum concentration and re-suspension to original volume in Brine A

| Dilution Factor | Mass Reduction | Size, nm | Zeta potential, mV | EE |
|---|---|---|---|---|
| As prepared (1x) | — | 162.9 ± 9.6 | 30.2 ± 0.55 | ND |
| 1.97x | 49% | 153.2 ± 14.5 | 29.2 ± 1.14 | ND |
| 7.5x | 87% | 156.0 ± 9.7 | 29.2 ± 1.16 | ND |
| All liquid removed (79.1x) | 99% | 231.7 ± 23.3 | 21.1 ± 1.35 | ND |

Concentration, Re-Suspension and HPAM Gelation with PEI25 kDa/PAA5.1 kDa/Cr(III)-PEC0

Multiple batches of Cr(III)-PEC0 were prepared (21 g 1% PEI–25 kDa (pH10)+3.48 g 0.443% PAA–5.1 kDa+0.72 g 10% CrCl$_3$.6H$_2$O) and 40 mL samples were dried under vacuum at ambient temperature in 50-mL polypropylene centrifuge tubes. Tubes were covered with Parafilm, which was pierced multiple times with a 23 gauge hypodermic needle to allow the escape of water vapor without loss of liquid during boiling. Samples that had been concentrated to different final masses were re-suspended in Brine A to their original concentration.

Figure 9:
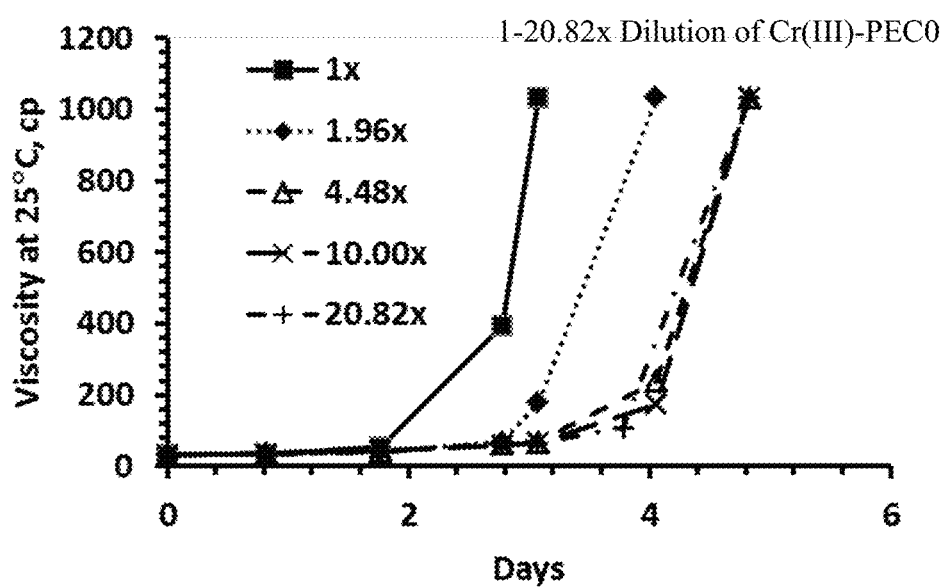
FIG. 9. Gelation of re-suspended PEI/PAA/Cr(III)-PEC0 [+] and AC24 incubated at 65° C. in Brine A following vacuum drying to different concentration factors. Gelation was delayed at higher concentration factors, which is consistent with higher salinity following re-suspension.

The re-suspended Cr(III)-PEC0 were characterized (size, zeta potential) and used to form gels with AC24. Characterization data is provided below in Table 9 and viscosity profiles are displayed in FIG. 9. The larger particles have the lowest zeta potential and longer gelation times.

TABLE 9

Characterization of Cr(III)-PEC0 after vacuum concentration and re-suspension to original volume in Brine A

| Dilution Factor | Mass Reduction | Size, nm | Zeta potential, mV | EE |
|---|---|---|---|---|
| As prepared (1x) | — | 105.1 ± 0.5 | 15.9 ± 2.0 | 83% |
| 1.96x | 49% | 106.3 ± 1.8 | 13.4 ± 1.0 | 82% |
| 4.48x | 78% | 105.5 ± 0.3 | 13.9 ± 2.1 | 87% |
| 10.0x | 90% | 115.4 ± 0.5 | 14.3 ± 0.7 | 83% |
| 20.82x | 95% | 133.8 ± 0.7 | 11.9 ± 1.6 | 88% |

Multiple batches of PEC39 prepared with commercial components (15.2 g 1% PEI–25 kDa (pH=9.55)+3.48 g 0.443% PAA–4.9 kDa+0.49 g 1.95% Cr) at single and double scale. No significant differences were seen between the batches and so they were pooled for further study.

40 mL samples of the Cr(III)-PEC39 were dried to about 5% of their original volume in a rotary evaporator under vacuum at several different temperatures and re-suspended in synthetic seawater or Brine A to their original concentration. Re-suspended PECs were characterized (size, zeta potential—Table 10) and used to form gelants with HPAM at 85° C. in synthetic seawater.

TABLE 10

Formulation and characterization of multiple batches of Cr(III)-PEC39 before concentration in a rotary evaporator

| | 0.5% PEI 25 kDa pH 9.55 (Lupasol WF) | 0.2215% PAA 4.9 kDa (FX605) | 1.95% Cr(III) (from 12.3%) | pH | Size, nm | Zeta potential, mV | Loading, ppm | EE, % |
|---|---|---|---|---|---|---|---|---|
| Single Batch | 15.2 g | 3.48 g | 0.49 g | 7.45 | 578 | 47.6 | 496 | 98.1 |
| | | | | 7.41 | 646 | 44.4 | 515 | 98.2 |
| | | | | 7.50 | 760 | 55.3 | 473 | 98.2 |
| Double Batch | 30.4 g | 6.96 g | 0.98 g | 7.46 | 394 | 41.4 | 540 | 98.3 |
| | | | | 7.47 | 548 | 53.3 | 535 | 98.3 |
| | | | | 7.43 | 522 | 52.2 | 510 | 98.3 |
| | | | | 7.48 | 865 | 50.3 | 515 | 98.0 |

Figure 10:
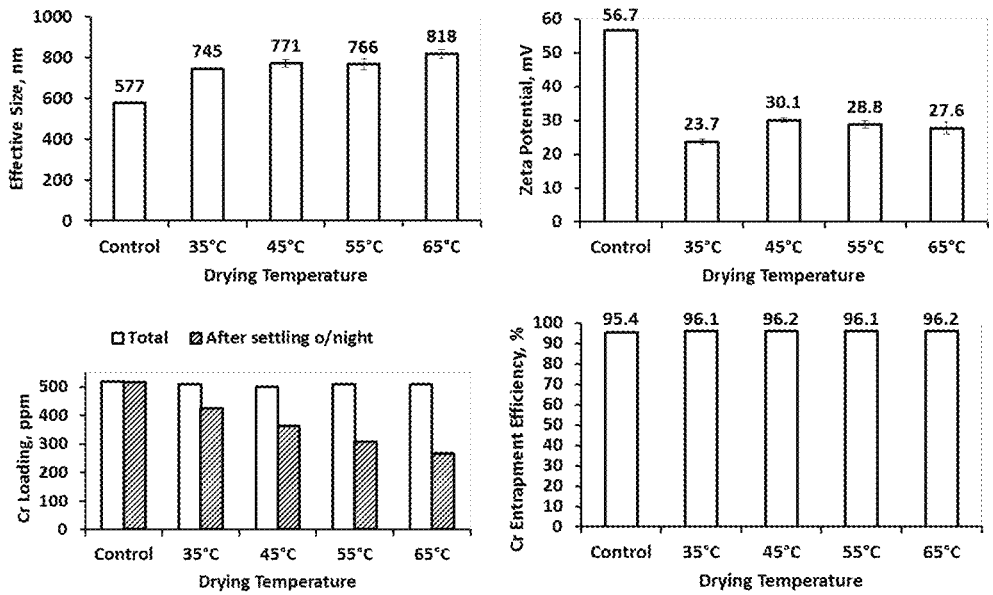
FIG. 10. Characterization of PEI/PAA/Cr(III)-PEC39 [+] after concentration at various temperatures and re-suspension in Brine A.
Figure 11:
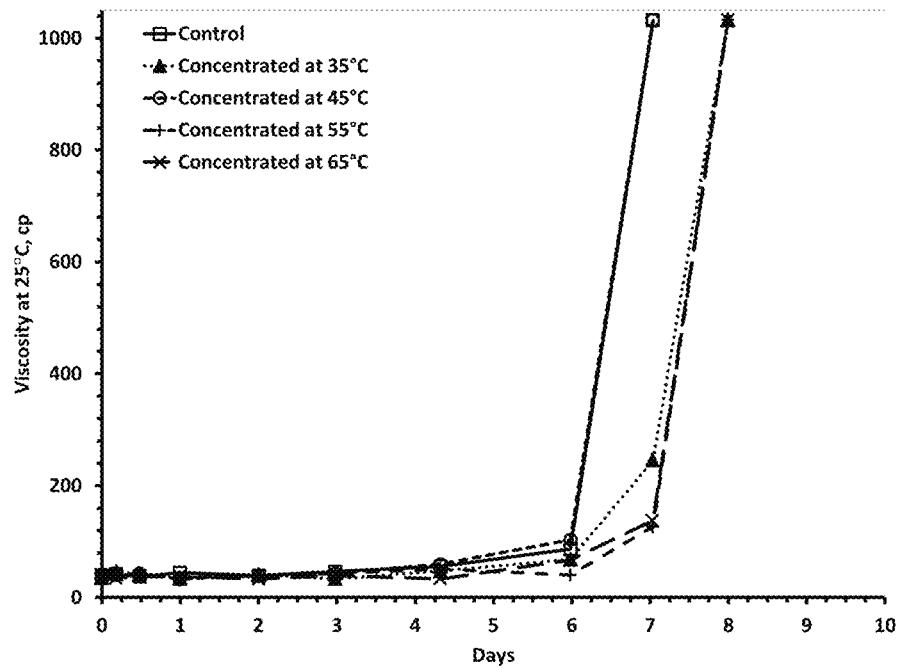
FIG. 11. Viscosity profile of 5000 ppm AC24 in Brine A with PEI/PAA/Cr(III)-PEC39 [+] (concentrated 20 times and reconstituted to final Cr(III) concentration of 100 ppm) incubated at 65° C. and measured at 25° C. to determine feasibility of concentrating PEI/PAA/Cr(III)-PEC39.

The Cr(III)-PEC39 were concentrated at drying temperatures of 35, 45, 55, and 65° C. Characterization data is shown in FIG. 10 and viscosity profiles of the concentrated and re-suspended PECs during gelation with AC24 are shown in FIG. 11. Longer gelation times were seen with the higher drying temperatures. However, the difference of one day in gelation time between the control and three of the four concentrated samples is most likely within experimental error.

Summary—Concentration of Cr(III)-PEC

Vacuum concentration at ambient temperature is very time-consuming. The time required can be reduced by elevating the temperature but this is associated with increasing flocculation and there are technical challenges associated with boiling at higher temperature under reduced pressure.

Figure 12:
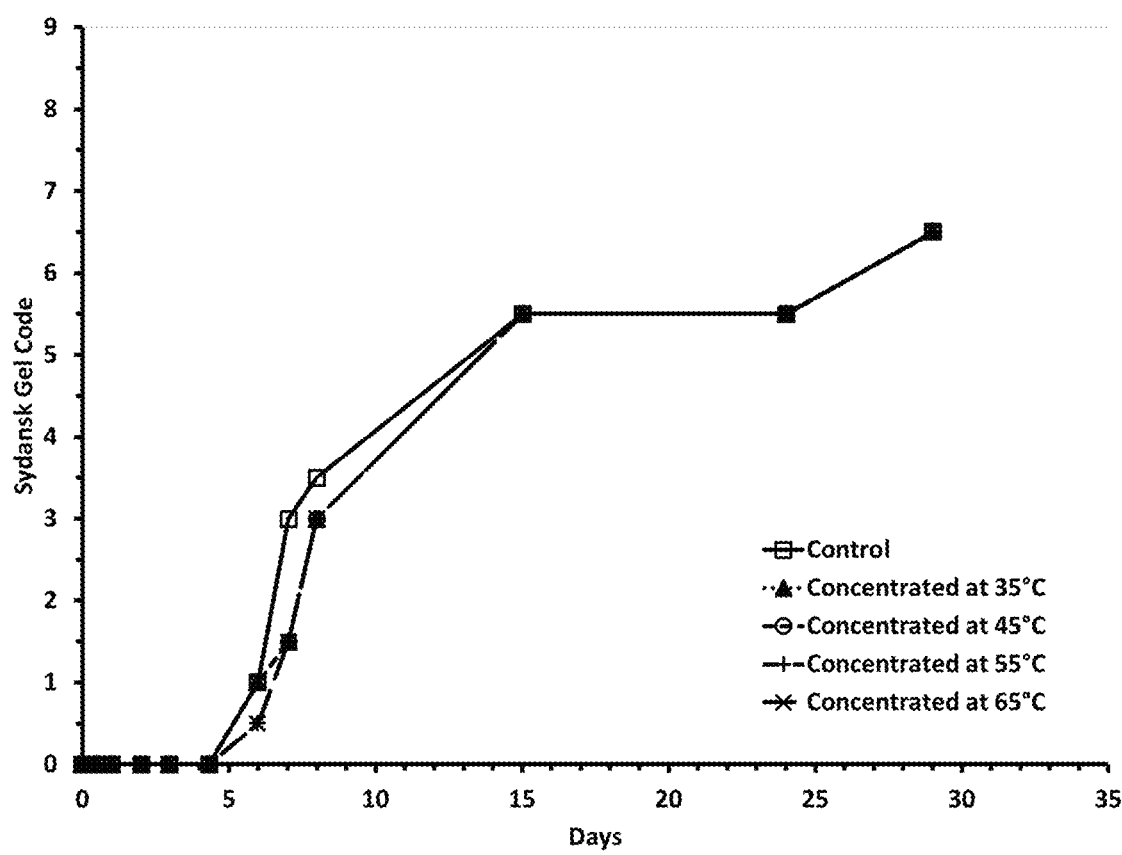
FIG. 12. Sydansk Gel Code of 5000 ppm AC24 and 100 ppm Cr(III) as PEI/PAA/Cr(III)-PEC39 [+] in SW, incubated at 65° C. and observed at room temperature. PEC suspensions were concentrated in a rotary evaporator to 5% of their original volume and resuspended in Brine A.

Concentration to 5% of the original volume does not appear to disrupt the particles, and they can be successfully resuspended in synthetic field brine, as shown in FIG. 12. Any changes in particle size and zeta potential, along with slight increases in gelation delay can be attributed to the salinity of the brine.

Retention of Cr(III)-PEC0 and AC24 gelant in Berea sand

It is important that the gelant does not suffer from excessive filtration, retention or chromatographic separation of its components during injection into high permeability subsurface features. A simple injection experiment was performed using a Berea sand pack as described above to test the retention of the gelant.

A batch of Cr(III)-PEC0 was assembled and characterized (results shown in Table 11) mixed with AC24 to form a gelant for the sand pack experiments. Final concentrations were 100 ppm Cr(III) as PEC and 5000 ppm AC24 in Brine A.

TABLE 11

Characterization of Cr(III)-PEC0 nanoparticles used in sandpack test

| Polyanion | [Cr(III)], ppm | pH | Size, nm | Zeta potential, mV | Entrapment Efficiency, % |
|---|---|---|---|---|---|
| PAA 5.1 kDa 20140328 Mean ± SE (N = 3) | 574 ± 13.6 | 9.0 ± 0.02 | 86.9 ± 0.56 | 40.1 ± 1.69 | 92.6 ± 0.47 |

Figure 13:
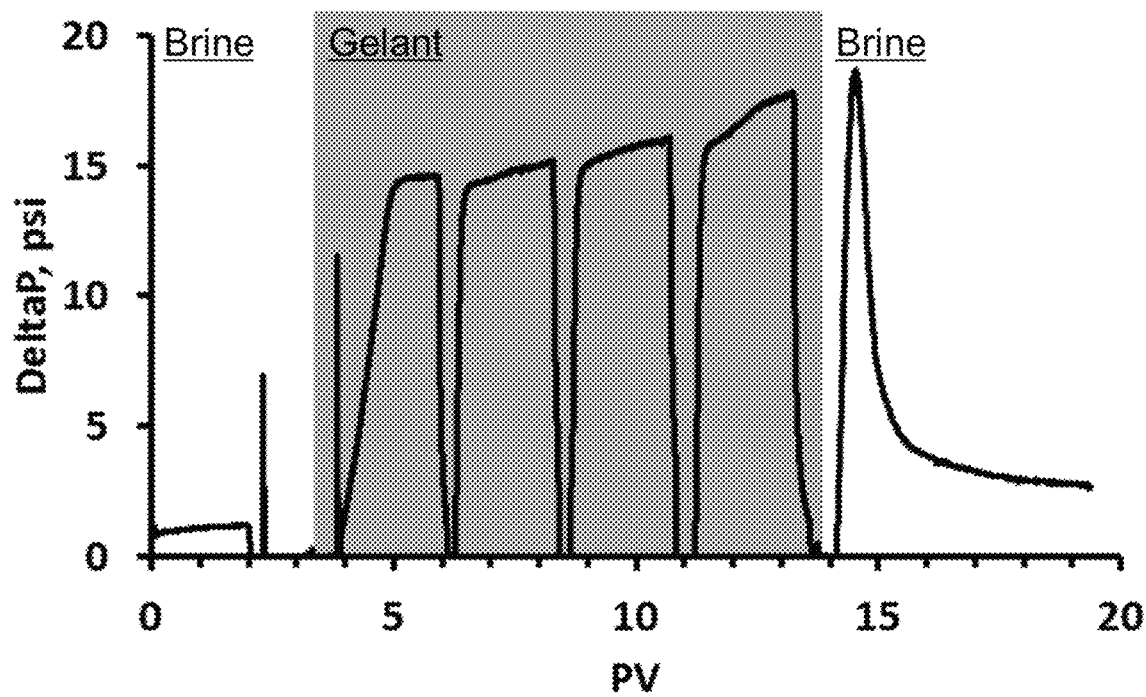
FIG. 13. Pressure drop profile during injection of PEI/PAA/Cr(III)-PEC0 [+] and AC24 gelant in Brine A into a Berea sandpack at 65° C. showed pressure drops consistent with the gelant viscosity.
Figure 14:
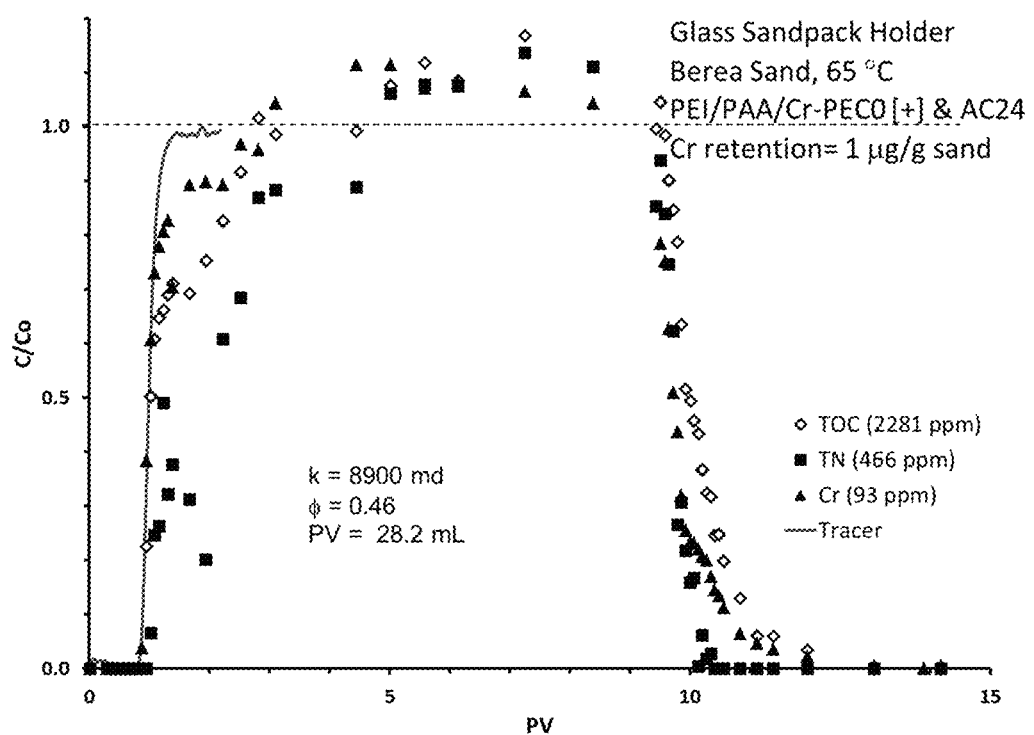
FIG. 14. Effluent components for PEI/PAA/Cr(III)-PEC0 [+] and AC24 injected in Brine A through a Berea sandpack held at 65° C. did not show significant retention.

FIGS. 13 and 14 displays the results for the sandpack trials. FIG. 13 shows the pressure drop profile wherein the drops correspond to the injection of several portions of gelant. This was done using a syringe pump of limited capacity. The points at which the pressure falls to zero correspond to the recharge of the syringe pump of the gelant. FIG. 14 shows the breakthrough of effluent concentration curve of the gelant, which matches the tracer. This shows that the gelant is not separating after injection. The TOC and TN results are also displayed.

Only a single formulation of PECs has been tested so far using the sand pack, but both the shape of the breakthrough curve compared to the tracer, and the material balance suggest that this formulation will not suffer from retention during injection into high permeability underground formations.

PEI/PAA/FE(III) PECS

The use of chromium is problematic in some environmentally-sensitive fields. The Applicants were interested in whether Cr(III) in PEC formulations can be replaced with other multivalent cations, such as Fe(III), while still retaining the delayed gelation features exemplified above. Thus, PEC formulations similar to Cr(III)-PEC0 and Cr(III)-PEC39 were prepared using iron.

Gelation of PEI/PAA/Fe and AC24

Cr(III) was replaced with Fe(III) on a stoichiometric basis. To maintain the overall volume and masses of the other components, the Fe stock solution concentration was reduced compared to the Cr(III) stock concentration. PECs were made with 21 g 1% PEI (pH10)+3.48 g 0.445% PAA-Na, 5.1 kDa+0.72 g multivalent cation stock and characterized. Table 12 compares the data for Cr(III)-PEC0 and Fe-PEC0.

TABLE 12

Characteristics of PEC0 made with Cr(III) and Fe(III)

| Multivalent cations stock solution | Measured [X] in PECs, ppm (Target = 558) | pH | Size, nm | Zeta potential, mV | EE |
|---|---|---|---|---|---|
| 10% CrCl$_3$•6H$_2$O | 585 | 8.9 | 88.7 | 31.9 | ≥89% |
| 9.5% FeCl$_3$•6H$_2$O | 589 | 9.1 | None Detected | None Detected | ≥40% |

Figure 15:
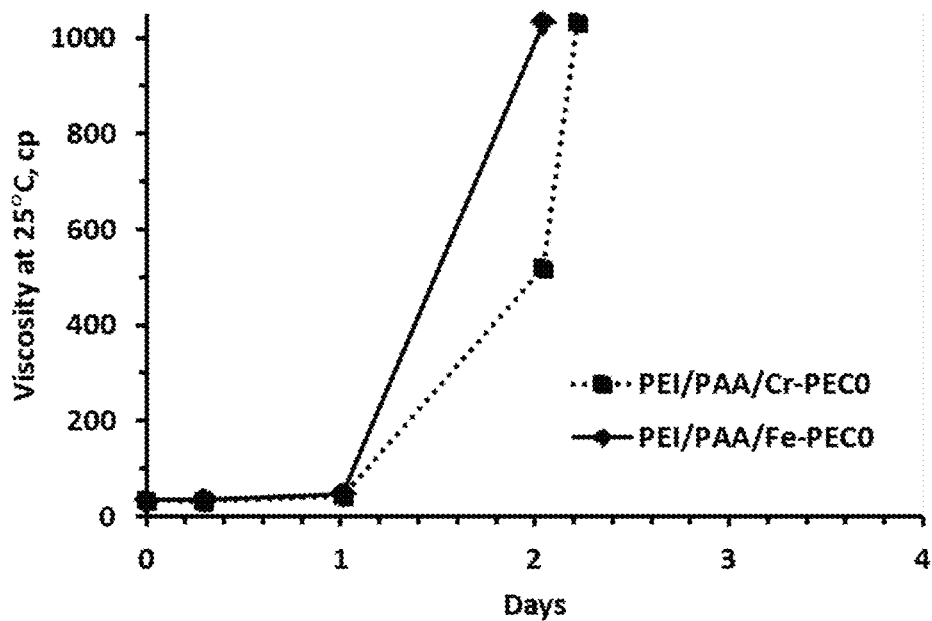
FIG. 15. Viscosity profile of equivalent PEI/PAA/Cr(III)-PEC0 [+] and PEI/PAA/Fe-PEC0 [+] with AC24 incubated at 65° C. in Brine A. Measurements were taken at 25° C.

As shown in Table 12, it proved difficult to detect any particles made with Fe(III), however—a pellet was formed following centrifugation and an orange-colored supernatant, indicating that at least some of the Fe was associated with the polyelectrolytes, but that a fraction either remained in solution, or was associated with PECs that were too small to be separated at the acceleration used. This was confirmed by measuring an entrapment efficiency of approximately 40%. The hypothesis that there may be a population of very small particles was supported by the fact that gelation behavior with AC24 was similar to that seen with an equivalent PEI/PAA/Cr PEC (Cr(III)-PEC0). FIG. 15 displays the viscosity profile for Cr(III)-PEC0 and Fe-PEC0 gelled with AC24. Similar gelation delays were obtained for both the Cr(III) and Fe PECs.

Similar to the Cr(III)-PECs, different variables in the Fe-PEC0 gelant were adjusted to determine their effect on the viscosity profiles.

Figure 16:
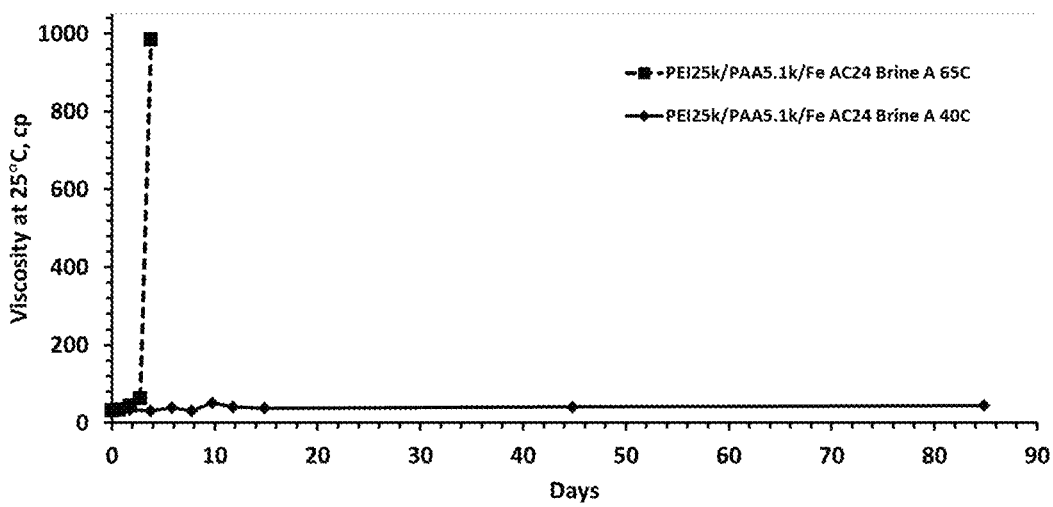
FIG. 16. Viscosity profile of PEI/PAA/Fe-PEC0 [+] and AC24 over time and incubated at two different temperatures. Measurements were taken at 25° C.

Fe-PEC0 was gelled with AC24 at two different temperatures, 40 and 65° C., and the viscosity plot is shown in FIG. 16. While Fe-PEC0 gelled within a few days at 65° C., no gelation occurred at 40° C. The non-gelation at 40° C. is not unexpected as similar systems have not gelled under 45° C. because there is not enough energy at this temperature.

Figure 17:
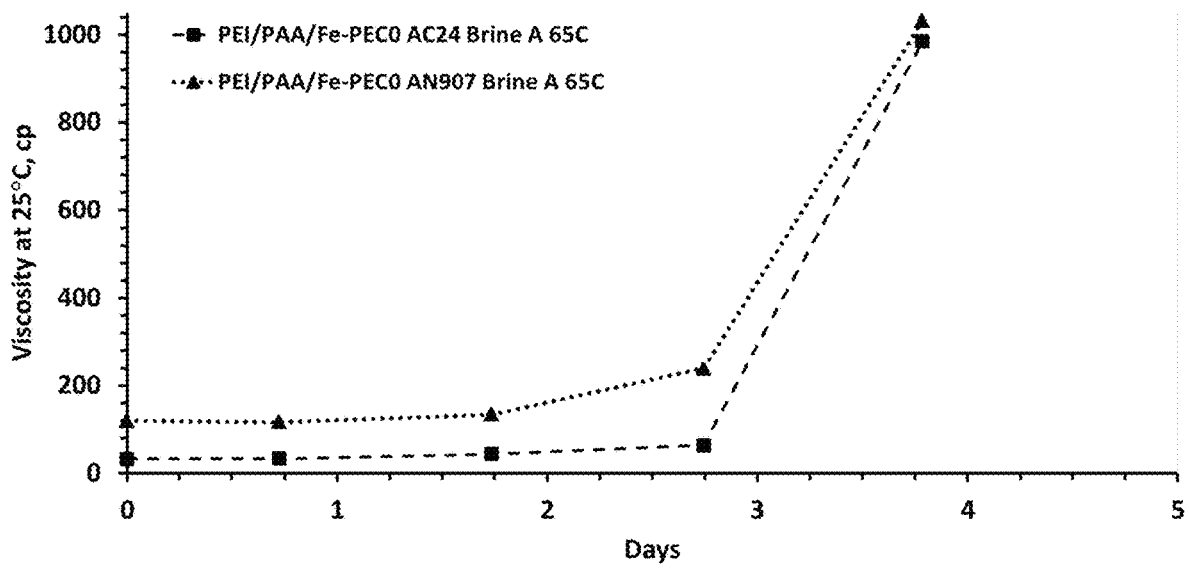
FIG. 17. Viscosity profile of PEI/PAA/Fe-PEC0 [+] with different sources of HPAM incubated in Brine A at 65° C. Gelants contain 5000 ppm HPAM from AC24, and AN907.

Different sources of HPAM, AC24, AN907 and AF254, were mixed with the Fe-PEC0 to obtain a final concentration of 5000 ppm HPAM and the viscosity profiles are shown in FIG. 17. While AC24 and AN907 gelled as expected, the Fe-PEC0 formulation was not found to be compatible with AF254.

Figure 18:
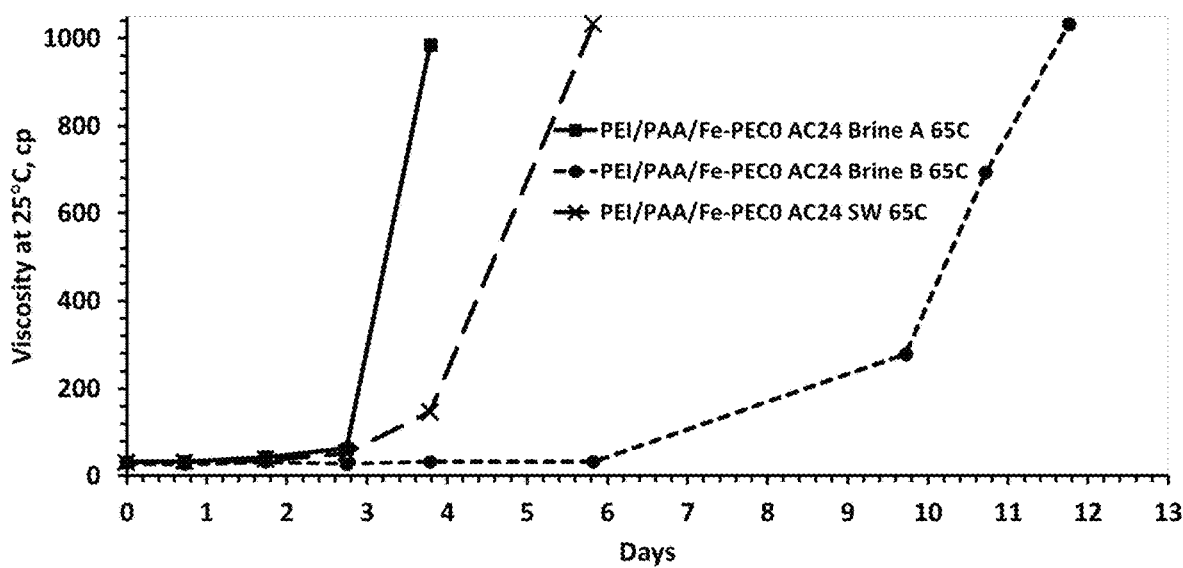
FIG. 18. Viscosity profile of PEI/PAA/Fe-PEC0 [+] and AC24 in different brines incubated at 65° C. Measurements were taken at 25° C. Gelation time is longer at higher salinity.

The brine used in the gelant was also tested and results are given in FIG. 18. Higher salinity brines results in longer delays in gelation.

Fe-PEC39

Fe-PEC39 was formulated by replacing Cr(III) in Cr(III)-PEC39 with Fe to overcome the incompatibility of Fe-PEC0 with some HPAMs. Formulation and characterization information is in Table 13.

TABLE 13

Characteristics of Fe-PEC39 made at two different batch sizes to show repeatabilty of formulation

| | 0.5% PEI 25 k pH 9.55 (Lupasol WF) | 0.2215% PAA 4.9 k (FX605) | 1.95% Fe(III) (from solid) | pH | Size, nm | Zeta potential mV | Loading, ppm |
|---|---|---|---|---|---|---|---|
| Single Batch | 15.2 g | 3.48 g | 0.49 g | 7.44 | 49.5 | NA | 476 |
| | | | | 7.50 | 50.8 | | 503 |
| | | | | 7.48 | 50.9 | | 506 |
| Double Batch | 30.4 g | 6.96 g | 0.98 g | 7.46 | 59.4 | NA | 518 |
| | | | | 7.43 | 57.1 | | 537 |
| | | | | 7.41 | 54.5 | | 558 |

Small but statistically significant differences in particle sizes were seen between single/double batches. It was confirmed by examining the particle size distribution data that the artificially low entrapment efficiency observed was due to inability to centrifuge small particles (approximately 10 nm). These small particles do not contribute strongly to the calculated effective diameter because this is based on intensity data and the larger particles contribute disproportionately to this measurement. Plotting the distribution on a volume basis makes the population of small particles more obvious. The instrument was unable to measure zeta potential.

As with Fe-PEC0, different gelants were prepared by varying the source of HPAM, the concentration of the HPAM and the final concentration of the Fe to determine how the gelation was affected and hopefully overcome the gelation issues that Fe-PEC0 encountered with the various HPAM sources. The different formulations are given in Table 14.

TABLE 14

Gelant formulations to control gelation of Fe-PEC39 and HPAM at 85° C. in synthetic seawater

| Fe-PEC39 (523 ppm Fe), g | 2% AC24, g | 2% AN907, g | 20% AF254S, g | Synthetic SW, g | Total, g | Fe(III), ppm | HPAM, ppm |
|---|---|---|---|---|---|---|---|
| 8.03 | 12.5 | — | — | 29.47 | 50 | 84 | 5000 |
| 8.03 | — | 12.5 | — | 29.47 | 50 | 84 | 5000 |
| 8.03 | — | — | 12.5 | 29.47 | 50 | 84 | 50,000 |
| 8.03 | 25.0 | — | — | 29.47 | 62.5 | 67.2 | 8000 |
| 8.03 | — | 25.0 | — | 29.47 | 62.5 | 67.2 | 8000 |
| 8.03 | — | — | 25.0 | 29.47 | 62.5 | 67.2 | 80,000 |
| 4.78 | 7.5 | — | — | 37.72 | 50 | 50 | 5000 |
| 4.78 | — | 7.5 | — | 37.72 | 50 | 50 | 5000 |
| 4.78 | — | — | 12.5 | 32.72 | 50 | 50 | 50,000 |

Figure 19:
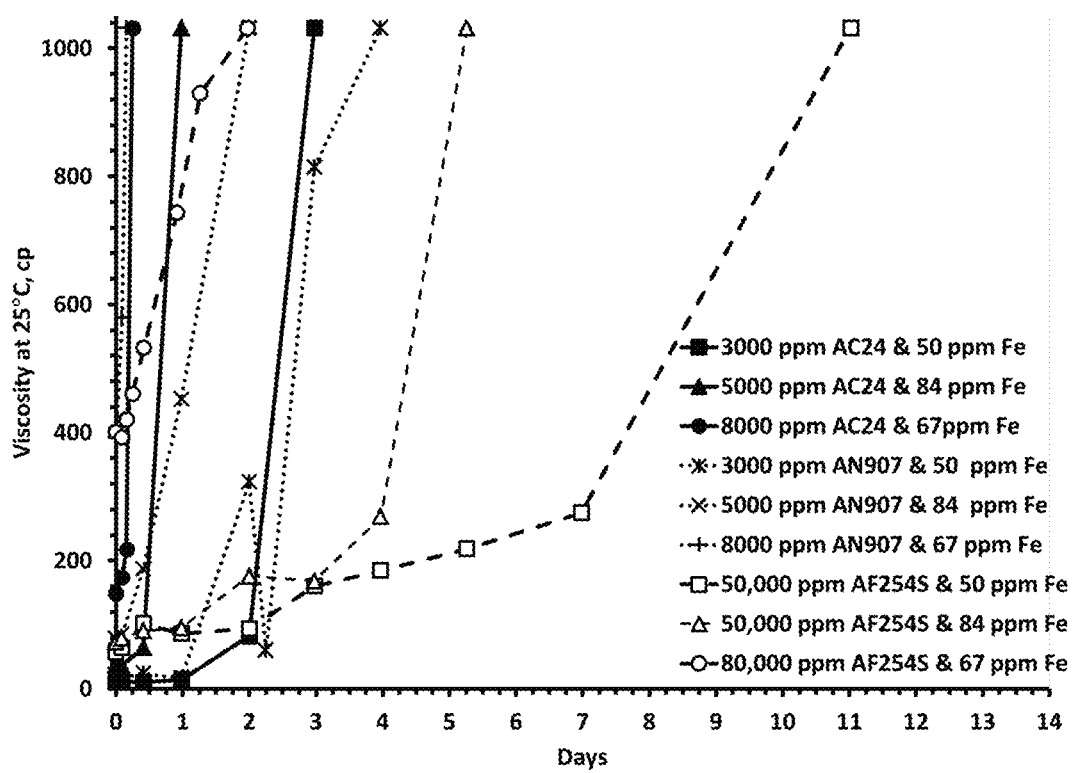
FIG. 19. Viscosity development of gelants with different concentrations of PEI/PAA/Fe-PEC39 [+] and HPAMs incubated at 85° C. in synthetic seawater. Measurements were taken at 25° C.
Figure 20:
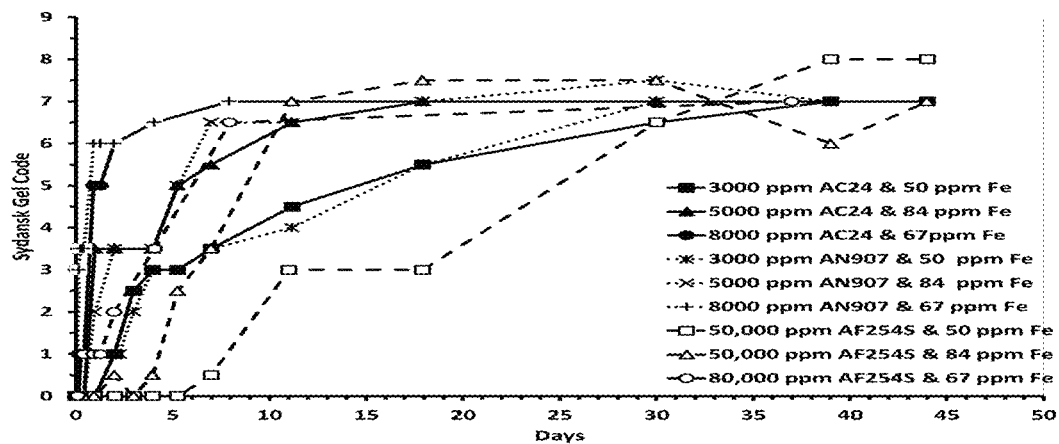
FIG. 20. Sydansk gel code of gelants with different concentrations of PEI/PAA/Fe-PEC39 [+] and HPAMs incubated at 85° C. in synthetic seawater.

FIG. 19 displays the viscosity profiles for the gelants in Table 14. Unlike Fe-PEC0, Fe-PEC39 formed gels with the AN254S. However, it should be noted that the Sydansk Gel Code data, shown in FIG. 20, indicates that gelants containing AF254S act as viscous liquids with viscosity >1032 cp (nominal gelation) and so the effective gelation delay is longer than would be inferred from the viscosity data alone. For the remaining compositions, delays of 2-3 days were experienced.

Based on these results, a range of concentrations are being studied to achieve a gelation delay of about four days under similar reaction conditions.

Additional lab tests on PEI/PVS polyelectrolyte complexes were performed with commercial grade components as described here. Polyethyleneimine, Lupasol WF (Mw=25 kDa) was obtained from BASF. Poly (sodium vinylsulfonate) (PVS) (25-35%, Mw=3-7 kDa) was obtained from Monomer-Polymer & Dajac Laboratories, Inc. Chromium (III) chloride solution 12.3% Cr(III))) was obtained from McGean. It is expected that a PVS molecular weight of less than 40,000 Da will demonstrate utility. However, focus was on the preferred range of less than 10,000 Da, and most preferably will be on PVS in the 3,000-7000 Da range.

Tables 15 details the formulation for one such PEI/PVS/Cr-2 PEC. The initial PEC characterization studies for this PEC are found in Table 16.

TABLE 15

PEI/PVS/Cr-2 PEC formulations

| 1% PEI Adjusted pH = 10.69 | 0.6125% PVS | 1.95% Cr(III) |
|---|---|---|
| 21.0 g | 3.48 g | 0.72 g |

TABLE 16

PEI/PVS/Cr-2 PEC Characterization results

| Particle Size (nm) | pH | Zeta potential (mV) | Cr(III) Loading (ppm) | Cr(III) Entrapment Efficiency (%) |
|---|---|---|---|---|
| 106.3 ± 1.1 | 9.0~9.2 | 28.6 ± 1.8 | 558 | 93.3 ± 0.6 |

Concentration and Re-Suspension of PECs

Several batches of the PEI/PVS/Cr-2 PEC were made and pooled together. PEC was concentrated to ~5% of original mass and then re-suspended in Brine A to the original concentration. The re-suspended PEC was characterized and the results are shown in Table 17.

TABLE 17

Characterization of PEI/PVS/Cr-2 PEC after vacuum concentration and re-suspension to original volume in Brine A

| | Size, nm | Zeta potential, mV | Cr loading, ppm | EE, % | pH |
|---|---|---|---|---|---|
| Mean of separate batches (N = 8) | 106.3 ± 1.06 | 28.58 ± 1.80 | 535.3 ± 5.04 | 93.3 ± 0.56 | 9.23 ± 0.01 |
| Pooled (Control) | 103.5 ± 0.21 | 26.98 ± 1.15 | 531 | 88.5 | 9.15 |
| Concentrated and re-suspended in Brine A | 230.1 ± 1.16 | 18.51 ± 0.26 | 504 | 92.4 | Nd |

Figure 21:
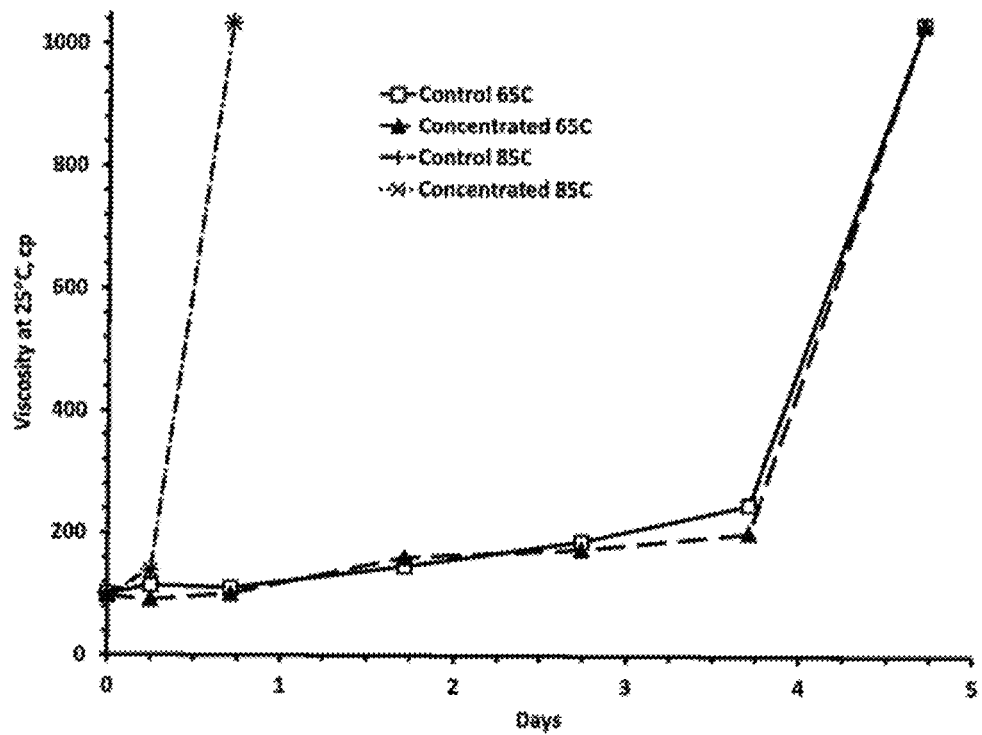
FIG. 21. Viscosity profiles of PEI/PVS/Cr-2 containing 100 ppm Cr(III) and 5000 ppm EOR204 HPAM in Brine A incubated both at 65° C. and 85° C. All components were commercial grade materials.
Figure 22:
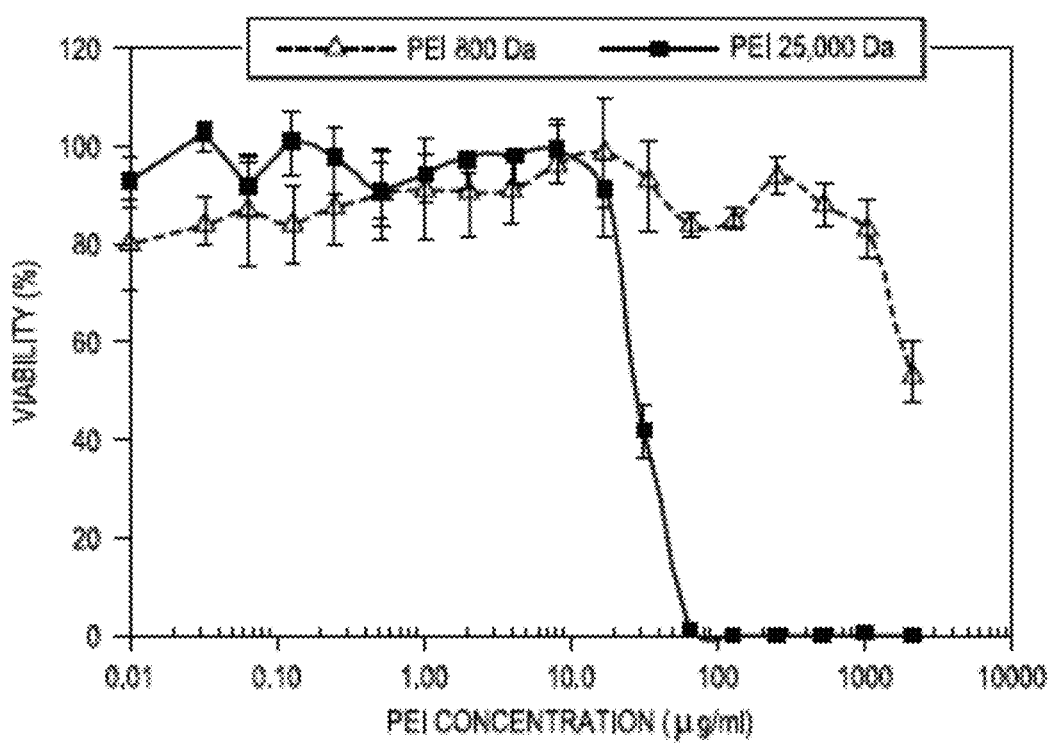
FIG. 22. Cytotoxicity of PEI 800D and PEI 25,000 D. The lower molecular weight PEI is much less toxic than the PEI of larger average molecular weight.

Gelation of PEI/PVS/Cr-2 PEC and EOR204:

FIG. 21 displays viscosity profiles of PEC (containing 100 ppm Cr(III)) mixed with 5000 ppm EOR 204 in Brine A to form a gelant. The gelant was incubated at both 65° C. and 85° C. The average gelation time was 1 day at 85° C. and 5 days at 65° C. Concentration and re-suspension of the PEC did not change the gelation behavior.

Each of the following references is incorporated herein in their entirety for all purposes.

US2010056399, US2008058229, U.S. Pat. No. 7,644,764, US20140209305

Cordova, M.; Cheng, M.; Trejo, J.; Johnson, S. J.; Willhite, G. P.; Liang, J.-T.; Berkland, C., Delayed HPAM gelation via transient sequestration of chromium in polyelectrolyte complex nanoparticles. Macromolecules 2008, 41 (12), 4398-4404.

Johnson, S. J.; Trejo, J.; Veisi, M.; Willhite, G. P.; Liang, J.-T.; Berkland, C., Effects of divalent cations, seawater and formation brine on positively charged polyethylenimine/dextran sulfate/Cr(III) polyelectrolyte complexes and HPAM/Cr(III) gelation. Journal of Applied Polymer Science 2010, 115 (2), 1008-1014.

The invention claimed is:

1. An improved method of sweeping a reservoir, wherein an injection fluid is injected into a reservoir to mobilize and produce oil, the improvement comprising injecting a composition comprising i) a polyelectrolyte complex nanoparticle having a polyalkylenimine and a polyanion, said nanoparticle having a size of less than one micron, wherein said polyanion is equal to or less than 10,000 Da, plus ii) a polymer, plus iii) a fluid into a reservoir, aging said composition at 65° C. for 4 days before its viscosity increases and becomes a gel injecting additional injection fluid into said reservoir to mobilize oil, and producing said oil.

2. A method of improving sweep efficiency of a fluid flood of a reservoir, said method comprising:
   a) injecting a composition comprising:
      i) a delayed gelling agent comprising a polyelectrolyte complex nanoparticle comprising a polyethylenimine of less than 26,000 Da and an ammonium polyacrylate, sodium polyacrylate or potassium polyacrylate of equal to or less than 10,000 Da intimately associated with at least one multivalent cation crosslinker, said nanoparticle having a size of less than one micron,
      ii) a polymer having anionic sites that can be crosslinked with said at least one multivalent cation crosslinker, and
      iii) a fluid into a reservoir;
   b) aging the composition at 65° C. for 4 days before its viscosity increases and becomes a gel;
   c) injecting an injection fluid into said reservoir to mobilize the oil; and
   d) producing said mobilized oil.

3. A method of improving sweep efficiency of a fluid flood of a reservoir, said method comprising:
   a) injecting a composition comprising:
      i) a delayed gelling agent comprising a polyelectrolyte complex nanoparticle comprising a polyethylenimine of less than 26,000 Da and a sodium, ammonium or potassium polyvinyl sulfonate equal to or less than 10,000 Da intimately associated with at least one multivalent cation crosslinker, said nanoparticle having a size of less than one micron,
      ii) a polymer having anionic sites that can be crosslinked with said at least one multivalent cation crosslinker, and
      iii) a fluid into a reservoir;
   b) aging the composition at 65° C. for 4 days before its viscosity increases and becomes a gel
   c) injecting an injection fluid into said reservoir to mobilize the oil; and
   d) producing said mobilized oil.

4. A method of improving sweep efficiency of a fluid flood of a reservoir, said method comprising:
   a) injecting a composition comprising:
      i) a delayed gelling agent comprising a polyelectrolyte complex nanoparticle comprising a polyethylenimine of less than 26,000 Da and an ammonium polyacrylate, sodium polyacrylate or potassium polyacrylate of equal to or less than 10,000 Da intimately associated with at least one multivalent cation crosslinker, wherein said multivalent cation crosslinker is Cr(III), Fe(III), or complexes of same, said nanoparticle having a size of less than one micron,
      ii) a partially hydrolyzed polyacrylamide polymer having anionic sites that can be crosslinked with said at least one multivalent cation crosslinker, and
      iii) a fluid into a reservoir;
   b) aging the composition at 65° C. for 4 days before its viscosity increases and becomes a gel;
   c) injecting an injection fluid into said reservoir to mobilize the oil; and
   d) producing said mobilized oil.

* * * * *